US009500445B2

(12) United States Patent
Hsieh et al.

(10) Patent No.: US 9,500,445 B2
(45) Date of Patent: Nov. 22, 2016

(54) MULTI-LAYER MATRIX COMPOSITE HAVING IMPROVED ENERGY ABSORPTION, DISSIPATION AND SHOCK WAVE MITIGATION CAPABILITIES

(71) Applicant: U.S. Army Research Laboratory, Adelphi, MD (US)

(72) Inventors: Alex Jer-Yann Hsieh, Winchester, MA (US); Tanya L. Chantawansri, Abingdon, MD (US); Jan W. Andzelm, North East, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 116 days.

(21) Appl. No.: 14/022,837

(22) Filed: Sep. 10, 2013

(65) Prior Publication Data
US 2015/0072118 A1    Mar. 12, 2015

(51) Int. Cl.
*F41H 5/04*      (2006.01)
*F41H 1/08*      (2006.01)
(Continued)

(52) U.S. Cl.
CPC ........ *F41H 5/0478* (2013.01); *B32B 2307/558* (2013.01); *B32B 2571/00* (2013.01); *B32B 2571/02* (2013.01); *F41H 1/02* (2013.01); *F41H 1/08* (2013.01); *F41H 5/0407* (2013.01);
(Continued)

(58) Field of Classification Search
CPC .............. F41H 5/04; F41H 5/26; F41H 1/08; B32B 27/40; B32B 27/42
USPC ....... 428/212, 213, 214, 215, 216, 217, 218, 428/219, 220, 423.1–423.3, 323–336, 428/312.6; 528/44–85, 367–369
See application file for complete search history.

(56) References Cited

U.S. PATENT DOCUMENTS 3,620,905 A * 11/1971 Ahramjian ................. 428/425.6
3,771,418 A * 11/1973 Gulbierz et al. ............. 428/911
(Continued)

FOREIGN PATENT DOCUMENTS

| WO | WO 0014137 A1 * | 3/2000 |
| WO | WO 2007050542 A1 * | 5/2007 |
| WO | WO 2012126934 A1 * | 9/2012 |

OTHER PUBLICATIONS

Hsieh, A. J., Orlicki, J. A., & Beyer, R. L. (2009). Molecular design of novel poly(urethane-urea) hybrids as helmet pads for ballistic and blast trauma mitigation [electronic resource] Alex J. Hsieh, Joshua A. Orlicki, and Rick L. Beyer. Aberdeen Proving Ground, MD : Army Research Laboratory, [2009].*
(Continued)

*Primary Examiner* — Maria Veronica Ewald
*Assistant Examiner* — Ethan A Utt
(74) *Attorney, Agent, or Firm* — Eric Brett Compton

(57) ABSTRACT

The disclosure relates to matrix composites comprising high strain-rate sensitive elastomers in a multi-layer construct which provide ballistic-resistant material systems with enhanced protection against blast damage as well as ballistic impact. According to one embodiment, a matrix composite for impact resistance and blast mitigation formed in a multi-layer configuration may include: (a) one or more outer layers comprising poly(urethane urea) having a strain-rate sensitivity characteristic in the range of 1,000/sec to 1,000,000/sec; and (b) one or more inner layers comprising poly(urethane urea) having a strain-rate sensitivity characteristic in the range of 10,000/sec to 1,000,000/sec.

31 Claims, 14 Drawing Sheets

(51) Int. Cl.
F41H 1/02 (2006.01)
F41H 5/08 (2006.01)

(52) U.S. Cl.
CPC .......... *F41H5/08* (2013.01); *Y10T 428/24942* (2015.01); *Y10T 428/249969* (2015.04); *Y10T 428/31554* (2015.04)

(56) References Cited

U.S. PATENT DOCUMENTS

| | | | |
|---|---|---|---|
| 4,208,507 A * | 6/1980 | Stutz et al. .................. | 528/64 |
| 4,569,982 A * | 2/1986 | Grogler et al. ............... | 528/64 |
| 4,581,433 A * | 4/1986 | Potter et al. ................. | 528/64 |
| 4,916,000 A | 4/1990 | Li et al. | |
| 4,934,245 A * | 6/1990 | Musante ................... | F41H 5/04 428/911 |
| 5,510,445 A * | 4/1996 | Haider et al. ................ | 528/64 |
| 5,654,053 A * | 8/1997 | Crane et al. ................. | 428/36.9 |
| 5,688,860 A * | 11/1997 | Croft .............................. | 525/75 |
| 5,690,526 A | 11/1997 | Lin et al. | |
| 5,731,367 A * | 3/1998 | Lee .............................. | 523/219 |
| 5,962,617 A * | 10/1999 | Slagel ........................... | 528/64 |
| 6,127,505 A * | 10/2000 | Slagel ........................... | 528/64 |
| 6,258,917 B1 * | 7/2001 | Slagel ........................... | 528/64 |
| 6,649,727 B1 | 11/2003 | Anderson et al. | |
| 7,037,865 B1* | 5/2006 | Kimberly .................... | 428/323 |
| 7,300,893 B2 | 11/2007 | Barsoum et al. | |
| 7,354,357 B2 * | 4/2008 | Sullivan et al. ............. | 473/373 |
| 7,919,418 B2 | 4/2011 | Bhatnagar et al. | |
| 7,938,053 B1* | 5/2011 | Dudt et al. .................... | 428/911 |
| 8,178,644 B2* | 5/2012 | Derderian et al. ............ | 528/64 |
| 8,256,019 B2 | 9/2012 | Ardiff et al. | |
| 8,372,939 B1* | 2/2013 | Derderian et al. ............ | 528/76 |
| 8,399,094 B2* | 3/2013 | Rukavina et al. ......... | 428/423.1 |
| 2006/0252577 A1* | 11/2006 | Sullivan et al. ............. | 473/371 |
| 2007/0093158 A1* | 4/2007 | Dudt .................... | F41H 5/0428 442/59 |
| 2007/0100112 A1* | 5/2007 | Sarpeshkar et al. ........... | 528/44 |
| 2007/0111621 A1* | 5/2007 | Barsoum ............... | F41H 5/0492 428/911 |
| 2007/0248827 A1* | 10/2007 | Rukavina et al. ......... | 428/423.1 |
| 2011/0185884 A1* | 8/2011 | Kruger ................. | F41H 5/0407 89/36.02 |
| 2012/0174761 A1 | 7/2012 | Dabich, II et al. | |
| 2012/0186002 A1 | 7/2012 | Bhatnagar et al. | |
| 2012/0196108 A1 | 8/2012 | Bhatnagar et al. | |
| 2014/0107291 A1* | 4/2014 | Eisen et al. .................. | 524/847 |

OTHER PUBLICATIONS

Hsieh, Alex J., Sarva, Sai S. and Rice, Norman, Sep. 2009, Improved Dynamic Strain Hardening in Poly(Urethane Urea) Elastomers for Transparent Armor Applications, Army Research Laboratory, www.dtic.mil/cgi-bin/GetTRDoc?AD=ADA516868.*
International Search Report for PCT/US98/21250, dated Jan. 15, 1999.*
International Search Report for PCT/US2006/041362, dated Feb. 21, 2007.*
International Search Report for PCT/EP2012/054968, dated Sep. 6, 2012.*
Rinaldi, R. G., Hsieh, A. J. and Boyce, M. C. (2011), Tunable microstructures and mechanical deformation in transparent poly(urethane urea)s. J. Polym. Sci. B Polym. Phys., 49: 123-135. doi: 10.1002/polb.22128.*
Rosthauser, J. W., Haider, K. W., Steinlein, C. and Eisenbach, C. D. (1997), Mechanical and dynamic mechanical properties of polyurethane and polyurethane/polyurea elastomers based on 4,4'-diisocyanatodicyclohexyl methane. J. Appl. Polym. Sci., 64: 957-970. doi: 10.1002/(SICI)1097-4628(19970502)64:5<957::AID-APP15>3.0.CO;2-Q.*
Yu, J. H., & Hsieh, A. J. (2010). Real-time dynamic impact strain deformation measurements of transparent poly(urethane urea) materials [electronic resource] / Jian H. Yu and Alex J. Hsieh. Aberdeen Proving Ground, MD : Army Research Laboratory, [2010].*
Parimal J. Patel, Alex J. Hsieh, Gary A. Gilde, "Improved Low-Cost Multi-Hit Transparent Armor," 25th Army Science Conference, Orlando FL. (2006).
C, M. Roland, R. Casalini, "Effect of hydrostatic pressure on the viscoelastic response of polyurea", Polymerx 48 (2007) 5747-5752.
R. B. Bogoslovov, C. M. Roland, and R. M. Gamache, "Impact-induced glass transition in elastomeric coatings," Appl. Phys. Lett. 90, 221910-12 (2007).
Paul E. Waith and Gary M. Gladysz PhD, "Protective Materials for Maritime Vessels," MAST 2009.
Sai S. Sarva and Alex J. Hsieh, "The effect of microstructure on the rate-dependent stress-strain behavior of poly (urethane urea) elastomers," Polymer 50 (2009) 3007-3015.
Trogamid® CX Transparent polyamides with an outstanding combination of properties. Evonik Industries. (2009).
Dureflex® A4700 Optical Aliphatic Polyether Polyurethane Film Product Information. Bayer MaterialSciences (May 2010).
Michelle K. Nyein et al., "In Silico Investigation of Intracranial Blast Mitigation with Relevance to Military Traumatic Brain Injury", A Proceedings publication of the National Academy of Sciences publication, 107, 48, 20703-20708 (2010).
MAJ Jason A. Morneault, "Head Protection," Advanced Planning Brief to Industry, (slide presentation) May 11-12, 2011.
Lionel R. Vargas-Gonzalez, Shawn M. Walsh, and James C. Gurganus, "Examining the Relationship Between Ballistic and Structural Properties of Lightweight Thermoplastic Unidirectional Composite Laminates," ARL-RP-0329, Army Research Laboratory, Aug. 2011.
Alex J. Hsieh and Kenneth E. Strawhecker, "Microstructure Analysis of Transparent Poly(urethane urea) Elastomers via AFM," (Paper and slide presentation), American Chemical Society National Meeting, Sep. 1, 2011.
Alex J. Hsieh, "Enabling Molecular Mechanisms for Tunable Microstructure and Properties Optimization of Transparent Elastomeric Materials," Defense Threat Reduction Agency, Chemical and Biological Materials Strategy Working Group Workshop, Sep. 15, 2011.
Honeywell Spectra Shield® II SR-3124 ballistic composite material for hard armor applications Product Information Sheet, © 2012 Honeywell International Inc.
Tanya Chantawansri, Yelena Sliozberg, Alex Hsieh, Jan Andzelm, "Coarse grain modeling of the high-rate stress-strain behavior for select model Poly[urethane urea] (PUU) elastomers," (Slide presentation) American Physical Society March Meeting, Feb. 29, 2012.
Renlong Gao, Mingqiang Zhang, Ninad Dixit, Robert B. Moore, Timothy E. Long, "Influence of ionic charge placement on performance of poly(ethylene glycol)-based sulfonated polyurethanes," Polymer 53 (2012) 1203-1211.
F.R. Svingala, M.J. Hargather, G.S. Settles, "Optical techniques for measuring the shock Hugoniot using ballistic projectile and high-explosive shock initiation," International Journal of Impact Engineering 50 (2012) 76-82.
Tanya L. Chantawansri, Yelena R. Sliozberg, Jan W. Andzelm, Alex J. Hsieh, "Coarse-grained modeling of model poly (urethane urea)s: Microstructure and interface aspects," Polymer 53 (2012) 4512-4524.
Tanya Chantawansri, Yelena Sliozberg, Jan Andzelm, Alex Hsieh, "High strain-rate mechanical deformation via coarse grain modeling for select model poly(urethane urea) elastomers," (Abstract and slide presentation) 244th ACS National Meeting, Aug. 22, 2012.
Alex J. Hsieh, Jeffrey K. Eliason, and Keith A Nelson, "Impulsive Stimulated Scattering Measurements of Select Model Transparent Elastomers," ARL-TR-6167, Army Research Laboratory, Sep. 2012.
Weiguo Hu, Alex J. Hsieh, Tanya L. Chantawansri, "A Solid-State NMR Method to Characterize Phase-Mixing Morphology in Poly(urethane urea)" (slide presentation), American Physical Society Meeting, Mar. 22, 2013.

(56) References Cited

OTHER PUBLICATIONS

Weiguo Hu and Alex J. Hsieh, "A Solid-State NMR Characterization of Phase-Mixing Morphology in Poly(urethane urea)" (slide presentation), American Chemical Society Meeting, Apr. 10, 2013.
Tanya L. Chantawansri and Alex J. Hsieh, "Pathway towards the Rational Design of High Performance Elastomers: From Molecules-by-Design to Multiscale Modeling" (slide presentation given remotely from the Army Research Laboratory, Aberdeen Proving Ground, MD), 2013 MACH Conference, Army Research Laboratory, Apr. 12, 2013.
"ACH-shaped Batlskin Viper V2 Helmet," Ground Combat Technology, vol. 4, Issue 1, Apr. 2013, p. 15.
Daniel T. Casem and Alex J. Hsieh, "Plate-Impact Measurements of a Select Model Poly(urethane urea) Elastomer," ARL-TR-6482, Army Research Laboratory, Jun. 2013.
Alex J. Hsieh and Tanya L. Chantawansri, "New Insight into Multi-functional Hierarchical Poly(urethane urea) Elastomers: From Molecules-by-Design to Multiscale Modeling," (Abstract), TMS, Mar. 3-7, 2013.
Tanya L. Chantawansri, Yelena R. Sliozberg, Alex J. Hsieh, and Robert A. Riggleman, "Quantifying segmental dynamics of model poly(urethane urea) systems using computational modeling," (Abstract), American Physical Society March Meeting, Mar. 22, 2013.
Weiguo Hu, Alex J. Hsieh, B. Christopher Rinderspacher, Tanya L. Chantawansri, "Structure and Dynamics Characteristics of HDMI and MDI-based Poly(urethane urea) Elastomers via Solid-State NMR," (Abstract), American Physical Society March Meeting, Mar. 22, 2013.
Weiguo Hu, and Alex J. Hsieh, "Solid-State NMR Characterization of a Select Model Poly(urethane urea) Elastomer," (Abstract), American Chemical Society Meeting, Apr. 11, 2013.
Kenneth E. Strawhecker, Alex J. Hsieh Tanya L. Chantawansri, Z. Ilke Kalcioglu, Krystyn J. Van Vliet, "Influence of microstructure on micro-/nano-mechanical measurements of select model transparent poly(urethane urea) elastomers," Polymer 54 (2013) 901-908.
Alex J. Hsieh, Sai S. Sarva, and Norman Rice, "Improved Dynamic Strain Hardening in Poly(Urethane Urea) Elastomers for Transparent Armor Applications," ARL-RP-280, U.S. Army Research Laboratory, Sep. 2009.
Alex J. Hsieh, Joshua A. Orlicki, and Rick L. Beyer, "Molecular Design of Novel Poly(urethane-urea) Hybrids as Helmet Pads for Ballistic and Blast Trauma Mitigation," ARL-TR-4764, U.S. Army Research Laboratory, Mar. 2009.
R. G. Rinaldi, A. J. Hsieh, M. C. Boyce, "Tunable Microstructures and Mechanical Deformation in Transparent Poly (urethane urea)s," Journal of Polymer Science: Part B: Polymer Physics 2010, 49, 123-135 (2010).
Alex J. Hsieh, et al., " Poly(Urethane Urea)s With Tunable Microstructures—From Robust Mechanical Strengthening to Chemical Hardening," 27th Army Science Conference, Nov. 29-Dec. 2, 2010.
Alex J. Hsieh, et. al. "New insight into microstructure-mediated segmental dynamics in select model poly(urethane urea) elastomers," Polymer 55 (2014) 1883-1892.

\* cited by examiner

Embodiment 100: A representative matrix composite.

A schematic of face shield 400

A schematic of transparent armor 500

MULTI-LAYER MATRIX COMPOSITE HAVING IMPROVED ENERGY ABSORPTION, DISSIPATION AND SHOCK WAVE MITIGATION CAPABILITIES

GOVERNMENT INTEREST

Governmental Interest—The invention described herein may be manufactured, used and licensed by or for the U.S. Government.

FIELD OF INVENTION

Embodiments of the present invention generally relate to a matrix composite systems for ballistic-resistant material systems, which may be useful for military, homeland security, law enforcement and other applications.

More particularly, these systems provide enhanced protection against blast and shockwaves, along with the potential for increased protection against mild traumatic brain injury (mild-TBI), blunt impacts, as well as ballistic impact performance against high energy fragments and small arms threats in accordance with the respective performance specification requirements.

The present invention identifies and discloses matrix composites that are used in a variety of applications such as helmet and armor material systems with enhanced blast mitigation and blunt impact protection, and face shields with enhanced blast mitigation and ballistic impact protection, potentially against traumatic brain injuries, for next generation integrated headgear protective systems. Embodiments of the present invention also can provide transparent lightweight armor with improved ballistic impact protection for vehicle windows shield systems.

BACKGROUND OF THE INVENTION

Protective helmets and armor have been used for both military and non-military applications to provide personnel protection, and are designed through a number of mechanisms, including elastic-plastic deformation, strain delocalization and shock impedance mismatch. These ballistic-resistant articles are typically formed by combining multi-layers of high strength fibers consolidated in a polymer matrix material. Thermoset resins are commonly used in a fiber reinforced composite structure for ballistic resistance. These include, but are not limited to, butyl rubber toughened phenolics along with aramid fabric reinforcements.

Also, thermoplastic resins are used in both rigid and flexible composites applications. These include elastomers such as styrene-isoprene-styrene and styrene-ethylene/butylene-styrene block copolymers, as well as polyurethanes. One of the major advantages of these thermoplastic resins is their applicability in the form of aqueous dispersions without the need of organic solvents, thus lessening environmental concerns. These types of thermoplastic resins are often used in conjunction with polyethylene fibers or the hybrid of aramid and polyethylene fibers to achieve the desired ballistic impact performance and stiffness requirements.

While conventional helmets and armor are suitable for protection against small arms fire (e.g., 9 mm hand-gun bullets) and fragmentation, these designs are not capable to divert and dissipate shockwaves from the head and thus are unable to prevent subsequent traumatic brain injury. Protection against blast and shockwaves, however, requires substantial improvement over such helmets due to the significantly increased pressure and energy expelled by the blast and shockwaves. In fact, it has been reported that soldiers in Iraq and Afghanistan when encountered shockwaves as a result of air blasts with overpressures in the kPa-1 MPa range often suffered mild to severe traumatic brain injury (TBI), which is detrimental and can result in long-term medical problems.

Thus, further improvements in protection against blast and shockwaves would be beneficial.

BRIEF SUMMARY OF THE INVENTION

Aspects of the present invention relate to a matrix composite comprising high strain-rate sensitive elastomers in the form of a multi-layer construct, which provides ballistic-resistant material systems with enhanced protection against blast damage as well as ballistic impact. High strain-rate sensitive elastomers, in accordance with this invention, are those with the capability to transition from rubbery-like towards glassy-like deformation response at strain rates, typically in the range of $10^3$-$10^6$/sec, and correspondingly, with potential to exhibit significant enhancement in shockwaves dissipation as well as in mechanical strength in comparison to the low rate loading properties.

According to one embodiment, a matrix composite for impact resistance and blast mitigation formed in a multi-layer configuration may include: (a) one or more outer layers comprising poly(urethane urea) having a strain-rate sensitivity characteristic in the range of 1,000/sec to 1,000,000/sec; and (b) one or more inner layers comprising poly(urethane urea) having a strain-rate sensitivity characteristic in the range of 10,000/sec to 1,000,000/sec.

The poly(urethane urea) may be formed of 4,4'-dicyclohexylmethane diisocyanate, diethyltoluenediamine, and poly(tetramethylene oxide), for example. In some embodiments, the poly(urethane urea)s of the one or more outer layers are formed of about 39 wt. % 4,4'-dicyclohexylmethane diisocyanate, about 13 wt. % diethyltoluenediamine, and about 48 wt. % poly(tetramethylene oxide), with the molecular weight of the poly(tetramethylene oxide) being about 650 g/mol. Or, in other embodiments, the poly(urethane urea)s of the one or more inner layers are formed of: about 31-34 wt. % 4,4'-dicyclohexylmethane diisocyanate; about 10-14 wt. % diethyltoluenediamine; and about 52-59 wt. % poly(tetramethylene oxide), with the molecular weight of poly(tetramethylene oxide) being about 1,000 g/mol. In some instances, the materials of the outer and inner layers may comprise the same poly(urethane urea) chemistry but have a predominantly phase-mixed microstructure.

The poly(urethane urea)s of the outer and inner layers are generally amorphous. And the poly(urethane urea)s of the outer and inner layers are not covalently cross-linked. In some embodiments, the one or more outer-layers or an intermediate layer can be formed of a prepreg material, with the prepreg materials including fiber reinforcements encapsulated in a poly(urethane urea) matrix.

In some embodiments, one or more outer-layers may include hollow glass microspheres encapsulated in a poly(urethane urea) matrix. The inner and outer layers can have a tensile modulus of at least about 1,320 psi (9.1 MPa) at 100% strain measured at a strain rate about 0.01/sec. And the one or more inner layers can have a greater tensile strength than those of the one or more outer layers, despite the one or more inner layers and the one or more outer layers having similar tensile modulus values.

The compressive flow stress values of the inner and outer layers at strain rates about 1,000-2,500/sec may be higher in comparison with the corresponding compressive flow stress values at strain rates about 0.01/sec. Also, the strain-rate sensitivity of the one or more outer layers may be greater than those of the one or more inner layers at a strain-rates of about 1,000-2,500/sec. The outer-most of the one or more outer layers may have the greatest strain-rate hardening characteristic of all layers. The segmental relaxation time of the outer-most of the one or more outer layers can be approximately $2\times10^{-2}$ s at 25° C. The values of segmental relaxation time of the one or more inner layers may be approximately $7.5\text{-}10.5\times10^{-6}$ s at 25° C. The one or more inner layers may comprise at least two different types of layers as a unit, the unit being repeated one or more times in the matrix composite. In various embodiments, one or more of the poly(urethane urea) layers can be applied as an adhesive, aqueous dispersion, or a film. Also one of the one or more outer layers can comprises a bi-layer that includes a poly(urethane urea) layer and a glass layer in some embodiments.

According to various embodiments, the matrix composites may be incorporated into various ballistic-resistant material systems. These may be configured as a helmet, armor, face shield, or a transparent window element, for instance. In the ballistic-resistant material system, each of the one or more outer layers may be approximately the same thickness; and each of the one or more inner layers may be approximately the same thickness.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. These embodiments are intended to be included within the following description and protected by the accompanying claims.

FIG. 1a shows the repeat unit of the chemical structure of the PUU elastomer. FIG. 1b shows the microstructure of the PUU elastomer. FIG. 1c shows micrographs of the extent of phase mixing of hard and soft segments in the PUU elastomer.

DETAILED DESCRIPTION OF THE INVENTION

Figure 1A:
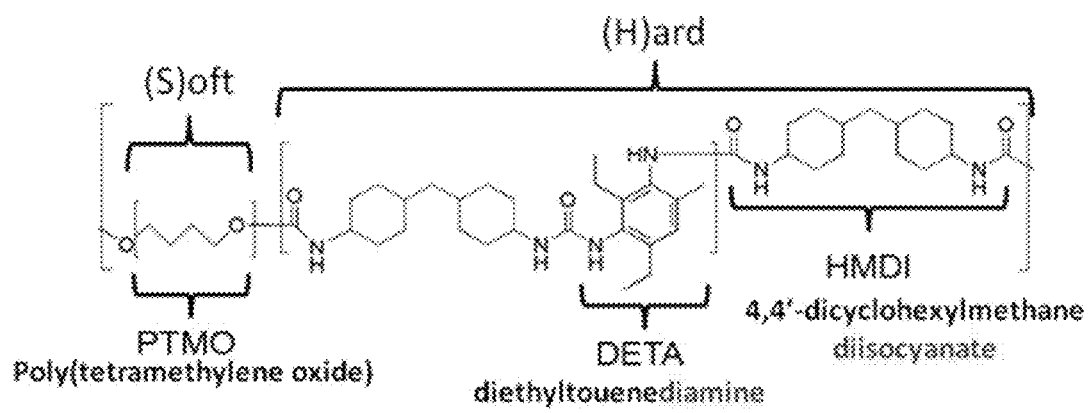
FIGS. 1a-1c show aspects of one poly(urethane urea) elastomer, useful for providing dynamic strain-rate hardening characteristics, according to an embodiment.

High performance elastomers which are capable of viscoelastic rubber-to-glass transition at increasing strain rates have potential for greater energy absorption and dissipation upon impact. This mechanism, as recognized by Bogoslovov R. B., Roland C. M., Gamache R. M., Applied Physics Letters, 90, 221910-12 (2007), is significantly different from a number of other potential mechanisms, including elastic-plastic deformation, strain delocalization and shock impedance mismatch, which have been utilized in design of conventional ballistic- and blast-resistant material systems.

By exploiting high strain-rate sensitive elastomers, a matrix composite formed of a multi-layer construct, is highly effective to dissipate impact energy. The matrix composite provides effective protection for helmets and other armor related systems against blast and shockwaves from explosions and ballistic impacts, in addition to protection against high energy fragments, small arms threats and blunt impacts. This will considerably enhance the safety of military personnel and law enforcement users when confronted with not only dangerous and potentially life-threatening situations such as projectile impact and blast events but also with potentially long-term depression as a result of mild traumatic brain injury from shockwave hazards.

More specifically, a matrix composite formed of a multi-layer construct is a key to providing an ballistic-resistant material system with enhanced energy dissipation and shockwaves damage mitigation capabilities. In addition, a broad range of applications can be derived in accordance with embodiments of the present invention.

For purposes of the invention, a matrix composite comprised of multiple elastomers having high strain-rate hardening characteristics is configured in a multilayer construct to provide ballistic-resistant material system with the potential of enhanced protection against blast and shockwaves, blunt trauma, and mild traumatic brain injuries, in addition to protection against shrapnel, high energy fragments and small arms threats. As used herein, the term "strain-rate hardening characteristic" means that the elastomers can undergo dynamic strain-rate hardening and stress dissipation by transitioning from a rubbery-like deformation response towards a glassy-like deformation response. More particularly, in the context of the invention, strain rates which the matrix composite in a multilayer construct may be subjected to, typically are expected to be in the range of about $10^3$-$10^6$/second. This range may be of relevance to many ballistic impact and blast events that are anticipated for many armor systems.

In accordance with various embodiments of this invention' elastomers that are capable of providing high strain-rate sensitivity may be utilized to dissipate impact energy. This can be realized as the deformation strain-rate is approaching or even greater than the average segmental mobility of a poly(urethane urea) elastomer, in which the elastomer will have a glassy-like behavior. The average segmental mobility is equivalent to the reciprocal of an average segmental relaxation time of a given polymer. The average segmental relaxation time can be determined, for example, by using broadband dielectric spectroscopy via a control system (such as a Novocontrol Concept system, for instance), whereby measurements of dielectric loss ($\in$") as a function of frequency are obtained in the frequency range of $10^{-1}$ to $10^6$ Hz. The segmental relaxation time is typically defined as the reciprocal of ($2\pi f_{max}$), where $f_{max}$ is the frequency of the peak maximum in the plot of dielectric loss vs. frequency.

Different types of intermolecular hydrogen bonding are present among the family of polyurethane, poly(urethane urea) and polyurea elastomers. The binding energy calculated using quantum mechanics for the hydrogen bonding between the urethane and urethane groups is about 10.3 kcal/mol, which is weaker than the corresponding binding energy values calculated for the hydrogen bonding between urethane and urea groups (about 13.0 kcal/mol) as well as for that between urea and urea groups (about 14.2 kcal/mol). The urethane-urethane hydrogen bonding is predominant in polyurethanes, whereas intermolecular urea-urea, urea-urethane and urethane-urethane hydrogen bonding are all present in poly(urethane urea)s, suggesting poly(urethane urea)s provide better mechanical strength in comparison with the corresponding polyurethanes.

Thus, in accordance with various embodiments of this invention, poly(urethane urea), which may be abbreviated herein simply as PUU, may preferably be used. PUU elastomers are thermoplastic, prepared from reaction of a diisocyanate, a diamine and a polyol. In various embodiments, the diisocyanate may be selected from the group consisting of 4,4'-methylene diphenyl diisocyanate, isophorone diisocyanate, 4,4'-dicyclohexylmethane diisocyanate, and any mixture thereof, the diamine may be selected from the group consisting of dimethylphenylenediamine, diethyltoluenediamine, 4,4'-methylenebis(cyclohexylamine), and any mixture thereof, and the polyol may be selected from the group consisting of poly(propylene oxide), poly(tetramethylene oxide), polycaprolactone diol, polycarbonate diol, and any mixture thereof.

The PUU elastomers may be formed to be generally amorphous and not chemically cross-linked. For instance, the choice of diisocyanate, diamine and polyol may all have functionality equal to about two, but no more, to ensure no chemical cross-linking reaction occurred during synthesis. Moreover, the choice of diisocyanate, diamine and polyol may be selected to render PUUs amorphous, but not crystalline or semi-crystalline.

According to aspects of the invention, elastomers may be prepared having unique properties. More particularly, the elastomers may have tunable microstructure and viscoelastic relaxation characteristics. In the case of PUU, segmental dynamics derived from the analysis of dielectric relaxation data obtained from dielectric spectroscopy measurements for select model PUU elastomers, can be used to tune the dynamic relaxation over a range of approximately four decades or greater in ambient conditions for energy absorption/dissipation and shock wave mitigation. The response tuning can vary with respect to their corresponding segmental mobility.

Previously, the influence of molecular mechanisms on microstructure evolution in select model PUUs was demonstrated by Strawhecker K. E., Hsieh A. J., Chantawansri T. L., Kalcioglu Z. I., Van Vliet K. J., in "Influence of microstructure on micro-/nano-mechanical measurements of select model transparent poly(urethane urea) elastomers," Polymer 54 (2013) 901-908, herein incorporated by reference in its entirety. PUUs, for instance, comprise a plurality of both hard and soft segments in polymer form—giving rise to a complex microstructure, wherein a broad range of phase formation may occur, including phase-mixed and microphase-separated regions, as well as any mixture thereof, that influence dynamic mechanical strengthening and chemical hardening. The extent of microphase separation which dependent upon the composition can be analyzed by using small-angle X-ray scattering, transmission electron microscopy and atomic force microscopy. Hard segments are formed by reaction of a diisocyanate and a diamine and provide rigidity and stiffness, whereas soft segments are predominantly composed of a long-chain polyol and provide flexibility and toughness, wherein polyol also reacts with a diisocyanate to form covalent bonds linking with hard segments in a polymer chain. The ratio or amount of hard and soft segments in the PUU polymer can be selectively tailored based on its versatile chemistry.

Using the molecular mechanisms previously demonstrated, the overall dynamic mechanical response thus can be optimized for one or more, and preferably each, elastomer layer of a multilayer construct in accordance with embodiments herein. In some cases, energy dissipation within the outermost layer(s) that face impacts may be maximized and energy absorption may be significantly improved throughout the multilayer construct. Molecular dynamic models can be used to study the effects of hard segment content and/or the molecular weight of the soft segments on local morphology and rate-dependent mechanical behaviors in the ballistic regime to determine a PUU chemistry having a particular strain-rate sensitivity characteristic.

FIG. 1a shows the repeat unit of the chemical structure of one PUU elastomer formed of 4,4'-dicyclohexylmethane diisocyanate (HMDI), diethyltoluenediamine (DETA), and poly (tetramethylene oxide) (PTMO) which provides dynamic strain-rate hardening characteristics according to embodiments of the present invention. For this PUU elastomer, the DETA and HDMI form hard segments (designated as "H" in the schematic shown in FIG. 1b), whereas the PTMO forms soft segments (designated as "S" in the schematic shown in FIG. 1b) of the polymer chain. In accordance with various embodiments, the PUU elastomers which are useful for high dynamic strain-rate hardening may comprise 25-42 weight percent (wt. %) 4,4'-dicyclohexylmethane diisocyanate, 11-21 wt. % diethyltoluenediamine, and 39-64 wt. % poly(tetramethylene oxide). The molecular weight of poly(tetramethylene oxide) may range from 650-1,000 g/mol, for example. These PUU elastomers can be formulated to have a tensile modulus of at least about 1,320 psi (9.1 MPa) at 100% strain measured at a strain rate about 0.01/second.

Figure 1B:
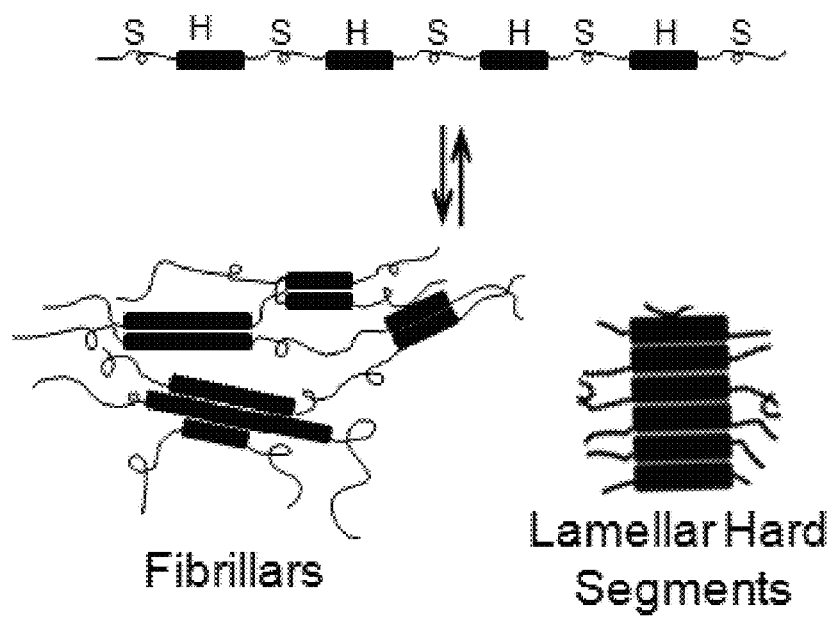

FIG. 1b shows the microstructure of the PUU elastomer. In particular, the hard and soft segments can arrange to form complex microstructure, whereas hard segments can self-assemble to form fibrillars and lamellar segments. The fibrillars may consist of hard segments interacting to form non-lamellar stiff regions oriented generally parallel along the axis of the polymer chains. They form when there is significant interaction between hard and soft segments or PTMO having lower molecular weights (correspondingly, the size of soft segments is relatively small), whereby the extent of phase mixing between hard and soft segments is significant.

On the other hand, the lamellar segments form through self assembly of hard segments oriented generally perpendicular to the axis of the polymer chain. They form primarily because of the strong bonding strength between hard segments, wherein the binding energy is about 14.2 kcal/mol, calculated using quantum mechanics for the hydrogen bonding between urea and urea groups. This is higher than the corresponding binding energy values calculated for the hydrogen bonding between urea and urethane groups as well as between urethane and urethane groups in a PUU-based polymer chain.

The degree of each structure present in the PUU elastomer depends on the specific chemistry of the polymer. More particularly, it has been found that the molecular weight of soft segment (i.e., PTMO) plays an important role in the extent of phase mixing and its effect on the corresponding segmental dynamics.

Figure 1C:
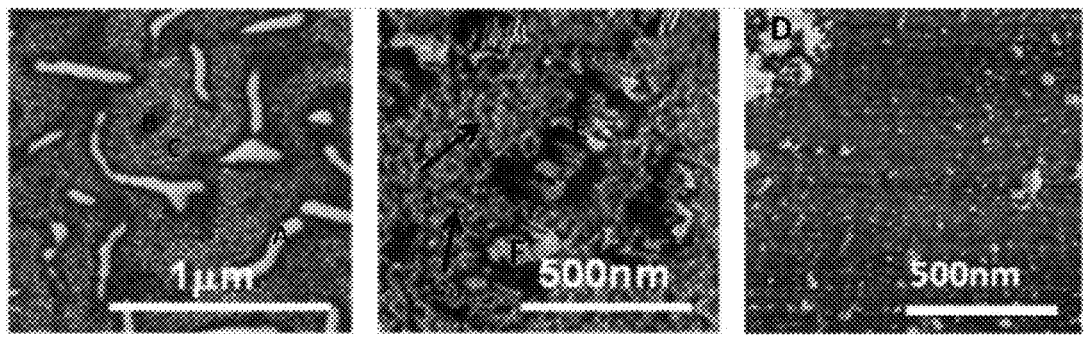

FIG. 1c shows the atomic force microscopy (AFM) micrographs of the extent of phase mixing of hard and soft segments as the molecular weight of PTMO (correspondingly, the soft segments) decreases (going from left-to-right). In the left-most micrograph, the polymer is comprised of irregularly-shaped rod-like features (indicated as "A" for a representative region shown in FIG. 1C, along with soft-segments-rich domains (indicated as "B" for a representative region shown in FIG. 1C) as well as phase mixed regions (indicated as "C" for a representative area shown in FIG. 1C). This composition of PUU is the most microphase separated of the three polymers. In the right-most micrograph, the polymer is comprised of mostly smaller features along with some irregularly shaped hard segments domains (indicated as "D" for a representative region shown in FIG. 1C). This composition of PUU has the most phase-mixing of the three polymers. The middle micrograph shows an intermediate microstructure, wherein hard segments form fibrillar-like structures (highlighted by arrows) as well as hard domain regions comprising rod-like lamellar hard segments oriented in parallel, which grow in long stacks (indicated by "E" for a representative region shown in FIG. 1C) or may lie next to each other to form irregularly shaped hard domains (indicated by "F" for a representative region shown in FIG. 1C).

Table 1, below, lists the compositions of three PUU elastomers—PUU A, PUU B and PUU C—along with the corresponding tensile modulus and tensile strength values determined at a strain rate about 0.01/second.

Tensile modulus refers to a measure of the stiffness of a material, whereas tensile strength refers to a measure of the ultimate capacity of a material to resist a tensile load before failure, although having the same units. In the context of the invention, these are important variables because the preferred PUU elastomers comprising optimized tensile stiffness and tensile strength, particularly in the form of a matrix composite in a multi-layer construct, can provide sufficient and desired mechanical strengthening for protection against ballistic impact. In some cases, PUU elatomers having similar tensile modulus values can possess different tensile strength values. Both the tensile modulus and the tensile strength can be varied by changing the composition of PUU elastomers.

Specifically, PUU A comprises about 31 wt. % 4,4'-dicyclohexylmethane diisocyanate, about 10 wt. % diethyltoluenediamine, and about 59 wt. % poly(tetramethylene oxide), where the molecular weight of poly(tetramethylene oxide) is 1,000 g/mol. PUU B comprises about 34 wt. % 4,4'-dicyclohexylmethane diisocyanate, about 14 wt. % diethyltoluenediamine, and about 52 wt. % poly(tetramethylene oxide), where the molecular weight of poly(tetramethylene oxide) is 1,000 g/mol. PUU C comprises about 39 wt. % 4,4'-dicyclohexylmethane diisocyanate, about 13 wt. % diethyltoluenediamine, and about 48 wt. % poly(tetramethylene oxide), where the molecular weight of poly(tetramethylene oxide) is 650 g/mol.

Microstructure is known to be very complex in thermoplastic elastomers. Typically, engineering thermoplastic elastomers, such as Kraton® and spandex (or Lycra®) are microphase-separated. In accordance with various embodiments of this invention, the preferred poly(urethane urea) elastomers that are capable of providing high strain-rate sensitivity comprise a preferred microstructure which is mostly phase-mixed, but predominantly not microphase-separated.

In further accordance of various embodiments of this invention, the extent of phase-mixing is most significant in PUU C of the preferred poly(urethane urea) elastomers based on the atomic force microscopy measurements, for example, as described by Strawhecker K. E., Hsieh A. J., Chantawansri T. L., Kalcioglu Z. I., Van Vliet K. J., in "Influence of microstructure on micro-/nano-mechanical measurements of select model transparent poly(urethane urea) elastomers," Polymer 54 (2013) 901-908.

Poly(urethane urea) elastomers of choice are versatile for property optimization. As will be appreciated, PUU B and PUU C are stiffer than PUU A, whereas tensile strength of PUU B is greater than that of PUU C, despite both have similar tensile modulus values.

TABLE 1

| PUU | Composition (wt. %) | | | | Tensile Modulus calculated based on flow stress at 100% strain Psi (MPa) | Tensile strength Psi (MPa) |
| --- | --- | --- | --- | --- | --- | --- |
| | 4,4'-dicyclo-hexyl methane diiso-cyanate | Diethyl-toluene diamine | poly (tetra-methylene oxide) | MW of poly (tetra-methylene oxide) | | |
| A | ~31 | ~10 | ~59 | ~1000 | ~1,320 (9.1) | ~5,874 (40.5) |
| B | ~34 | ~14 | ~52 | ~1000 | ~3,205 (22.1) | ~8,731 (60.2) |
| C | ~39 | ~13 | ~48 | ~650 | ~3,263 (22.5) | ~6,309 (43.5) |

Figure 2:
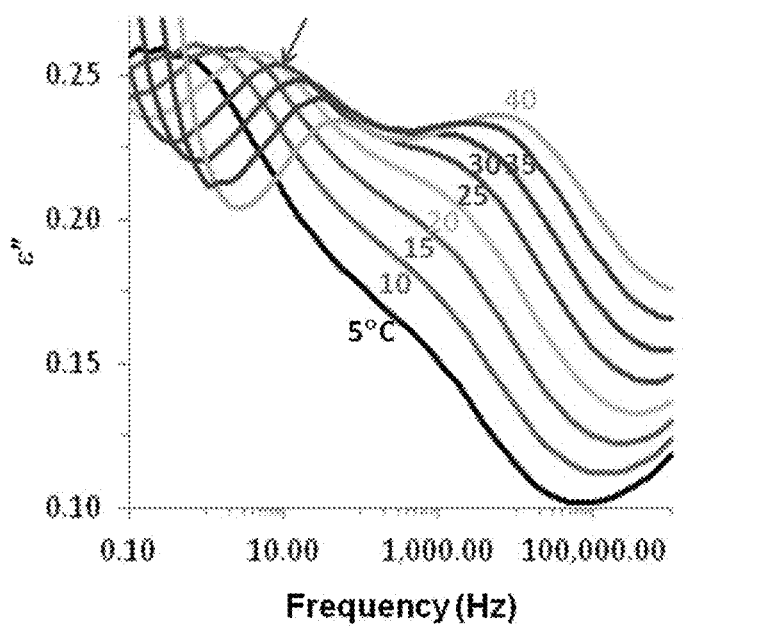
FIG. 2 shows the dynamic response of poly(urethane urea) elastomers to a broad range of frequencies under dielectric spectroscopy analysis, according to an embodiment.

FIG. 2 shows the dynamic response of PUU C to a broad range of frequencies under dielectric spectroscopy analysis. The segmental relaxation time determined at 25° C. (the plot depicted by an arrow) is approximately $2 \times 10^{-2}$ second; correspondingly the apparent segmental mobility which is approximately equivalent to the reciprocal of segmental relaxation time is approximately 50 $\sec^{-1}$ This suggests that PUU C will readily respond in a glassy-like deformation behavior at strain rates of about $10^3$ $s^{-1}$ and higher.

Table 2, below, lists the values of segmental relaxation time, determined at 25° C., of various PUU elastomers, useful for this invention, wherein the strain-rate sensitivity varies over the range of strain-rate $10^3$-$10^6$/sec. This range is of particular relevance to the blast and ballistic loading conditions, and thus the potential of dynamic strain-rate hardening to provide an armor material with significantly enhanced dynamic strengthening and energy dissipation capabilities. Also, the average segmental relaxation time is much shorter for PUU C than PUU B, indicative of greater strain-rate sensitivity for PUU C at strain rates about $10^3$ $\sec^{-1}$, despite both having similar tensile modulus values. Thus, PUU C has potential to provide effective blast mitigation capability, particularly with respect to protection against mild traumatic brain injuries.

TABLE 2

| PUU | Average segmental relaxation time (sec) | Average segmental mobility ($\sec^{-1}$) |
| --- | --- | --- |
| A | ~7.5 × $10^{-6}$ | ~1.33 × $10^5$ |
| B | ~10.5 × $10^{-6}$ | ~9.5 × $10^4$ |
| C | ~2 × $10^{-2}$ | ~50 |

These PUU elastomers and others useful in the present invention have dynamic strain-rate hardening characteristics in the strain-rate range of 10,000/sec to 1,000,000/sec. Furthermore, some poly(urethane urea) elastomers, such as PUU C, have a broader dynamic strain-rate hardening capability, in particular, over the range of 1,000/sec to 1,000,000/sec.

Figure 3:
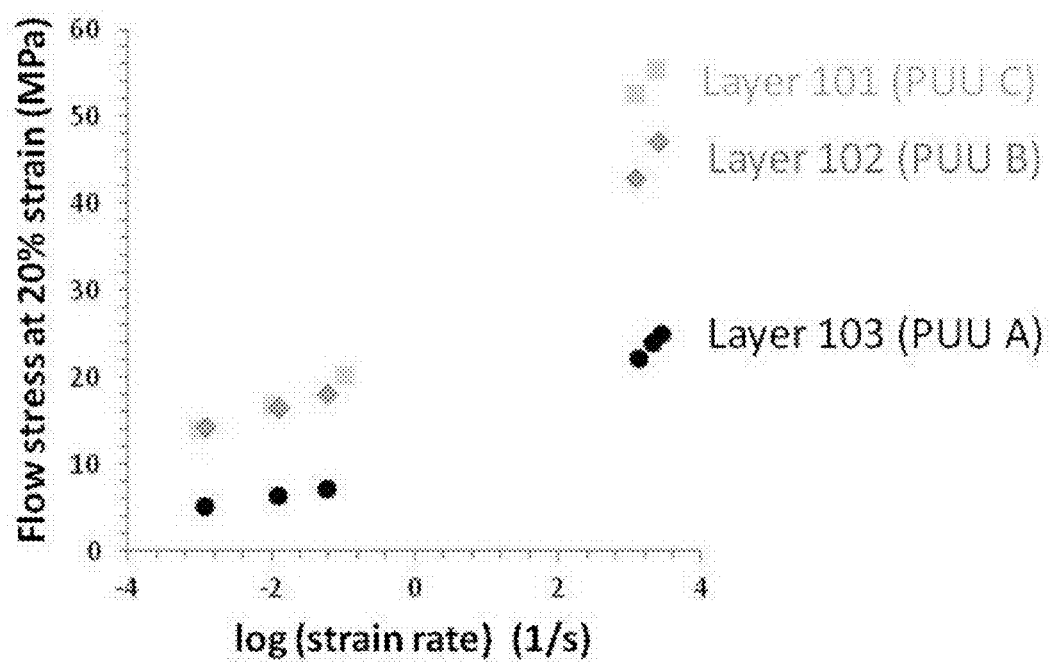
FIG. 3 shows the extent of dynamic strain-rate hardening characteristics of poly(urethane urea) elastomers, according to an embodiment.

FIG. 3 is a plot showing the extent of dynamic strain-rate hardening characteristics of the PUU elastomers listed in Table 1. The plot shows compressive flow stress versus the log of strain for highlights of the variation in the extent of dynamic strain-rate sensitivity of these PUU elastomers. The plot of flow stress at 20% strain vs. strain rate reveals that PUU B and PUU C are generally stiffer than PUU A, and additionally, flow stress values obtained for PUU A, PUU B and PUU C, at strain rates about 1,000-2,500/sec under split Hopkinson pressure bar compression impact measurements, are higher in comparison with the corresponding flow stress values obtained from low rate compression measurements. For example, PUU A exhibits an increase in the flow stress at 20% strain, from about 930 psi (6.4 MPa) to about 3,600 psi (24.8 MPa), from low strain-rate loading to high strain-rate loading at about 3,200/sec. The complete details of split Hopkinson pressure bar compression testing procedures are provided in Sarva S, Hsieh A. J., "The effect of microstructure on the rate-dependent stress-strain behavior of poly (urethane urea) elastomers," Polymer, 50, 3007-3015 (2009).

At strain rates of about 1,000-2,500/sec, the flow stress values obtained for PUU C are about 7,200-8,000 (50-55 MPa) which are higher than those for PUU B, about 6,100-6,800 psi (42-47 MPa). This is despite the fact that both PUU B and PUU C have similar flow stress values at low strain-rates over the range between about 0.001/second and about 0.1/second. This is indicative of higher strain-rate sensitivity of PUU C than PUU B over the strain-rate about 1,000-2,500/sec, which is a result of the difference in average segmental relaxation time (shown in Table 2) based on the dielectric relaxation measurements via utilizing broadband dielectric spectroscopy. The segmental relaxation time determined at 25° C. is approximately $2 \times 10^{-2}$ sec, correspondingly the apparent segmental mobility which is approximately equivalent to the reciprocal of segmental relaxation time is approximately 50 $\sec^{-1}$, suggesting that PUU C will readily undergo glassy-like deformation at strain rates about $10^3$ $s^{-1}$ and higher. The average segmental relaxation time is much shorter for PUU C than PUU B, indicative of greater strain-rate sensitivity for PUU C at strain rates about $10^3$ $\sec^{-1}$, despite both having similar tensile modulus values. Thus, PUU C has potential to provide effective blast mitigation capability, particularly with respect to protection against mild traumatic brain injuries.

Dynamic strain-rate hardening of the PUU B elastomer is further highlighted by using plate impact measurement, wherein extremely high pressure and high strain-rate loading conditions are present. Details of plate impact testing procedures can be found in Casem D. T., Hsieh A. J., U.S. Army Research Laboratory Technical Report, ARL-TR-6482, June (2013). In general, the poly(urethane urea) specimens of disk-shaped, nominally 3.4 mm in thickness and 40 mm in diameter, are accelerated in a light gas gun and impacted against stationary soda lime glass target plates (nominally 2.0-mm thick, 40-mm diameter) at select impact speeds. The soda lime glass remains elastic throughout the experiments and the poly(urethane urea) undergoes uni-axial strain loading, whereby an inherent local confinement results in high stress in poly(urethane urea) elastomers.

Figure 4:
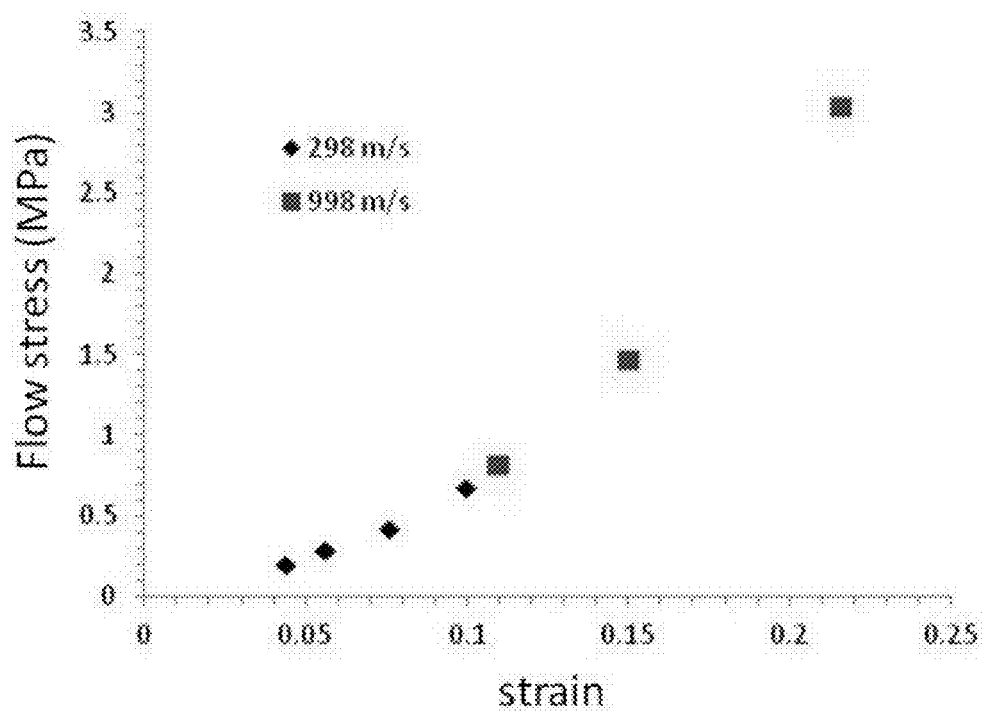
FIG. 4 shows the results from plate impact measurements of a select poly(urethane urea), highlighting the dynamic strain-rate hardening upon high pressure and high strain-rate loading.

FIG. 4 is a plot showing the results from plate impact measurements of PUU B highlighting the dynamic strain-rate hardening upon high pressure and high strain-rate loading. The segmental relaxation time of PUU B is about $10.5 \times 10^{-6}$ sec, thus the corresponding segmental mobility $\sim 9.5 \times 10^4$/sec is about an order of magnitude slower than the strain rates under plate impact loading, indicative of strong dynamic strain-rate hardening. The plot shows results from plate impact measurements at impact speeds of 298 m/sec and 998 m/sec, respectively. The stress of PUU B reaches about 0.7 and 3 GPa at a strain rate about $1\times10^6$/sec and $7\times10^6$/sec, respectively, where there is a substantial pressure contribution under plate impact.

In some embodiments, thermoplastic poly(urethane urea) elastomers of high strain-rate sensitivity may be formed to be generally amorphous, rather than crystalline or semi-crystalline. These types of PUU elastomers, having a tensile modulus at 100% strain of at least 1,320 psi (9.1 MPa). Despite being amorphous, they have considerably higher tensile modulus values in comparison with what has been previously reported for semi-crystalline polyurethane in U.S. Pat. No. 8,256,019 B2.

In accordance with certain embodiments, the amorphous thermoplastic poly(urethane urea) elastomers that are high strain-rate hardening are not chemically cross-linked. These compositions are formed of three components, i.e., a diisocyanate, a diamine and a long chain polyol, for properties optimization, with the choice of diisocyanate, diamine and polyol having preference to render PUUs being amorphous but not crystalline or semi-crystalline. The choice of diisocyanate, diamine and polyol all having functionality equal to about two, but not higher, to ensure no chemical cross-links formation. The choice of a three-component poly(urethane urea) is robust in varying composition for property optimization. The dynamic strain-rate hardening characteristics can be greater than that of conventional elastomers. For example, the tensile modulus of poly(urethane urea) elastomers can be tailored to be at least about 1,320 psi (9.1 MPa) at 100% strain, higher than that previously reported for polyurea elastomer, of about 1,000 psi (6.9 MPa), as disclosed in U.S. Pat. No. 7,300,893 B2.

In Table 3, below, the flow stress at 20% strain, for the poly(urethane urea) elastomer, increases from about 928 psi to about 4,293 psi, from low rate loading to high rate loading at about 3200/sec, which is much more strain-rate sensitive in comparison with an increase from about 833 psi to about 2,361 psi at high rate loading of about 3500/sec for the polyurea disclosed in FIG. 6 of U.S. Pat. No. 7,300,893 B2.

TABLE 3

| | Flow Stress at 20% strain Strain rate (1/sec) | |
|---|---|---|
| | ~0.01 | ~3200*-3500** |
| Amorphous, non-chemically cross-linked PUU [same as PUU A in Table 1] | 6.4 MPa (928 psi) | *29.6 MPa (4,293 psi) |
| Cross-linked polyurea [comparative example] | 5.7 MPa (833 psi) | **16.3 MPa (2,361 psi) |

In further accordance with embodiments, the poly(urethane urea) elastomers in a multi-layer construct may be designed and configured to provide ballistic-resistant articles, such as helmet and armor material systems, with enhanced protection against shockwaves, varying from blast loading (e.g., strain rates about $10^3$-$10^4$/sec) to ballistic impact under extreme strain rates up to about $10^6$/sec.

For example, the outer and inner layers of the multi-layer construct may be configured to behave differently to the strain rate. More particularly, in a multi-layer construct, one or more outer layers of poly(urethane urea) elastomer materials—i.e., those which are exterior or close to the exterior to a helmet or armor material system—are configured to have greater dynamic strain-rate hardening characteristics to provide the helmet or armor material system with enhanced dynamic strengthening and stiffening against ballistic and blast threats than other, more interior, layers. As such, one or more outer layers may be configured to provide significantly high energy dissipation, whereas, one or more inner layers may be configured to provide moderate energy dissipation but significant energy absorption compared to the outer-layers, under both ballistic impact and blast exposure conditions. Furthermore, the outer-most layer of poly(urethane urea) multi-layer construct may be configured to have the greatest dynamic strain-rate hardening of the layers so as to provide the greatest capability to efficiently dissipate the shockwaves and impact energy. In one embodiment, the one or more outer layers may have strain-rate sensitivity characteristics in the range of 1,000/sec to 1,000,000/sec and the one or more inner layer may have strain-rate sensitivity characteristic in the range of 10,000/sec to 1,000,000/sec.

Figure 5:
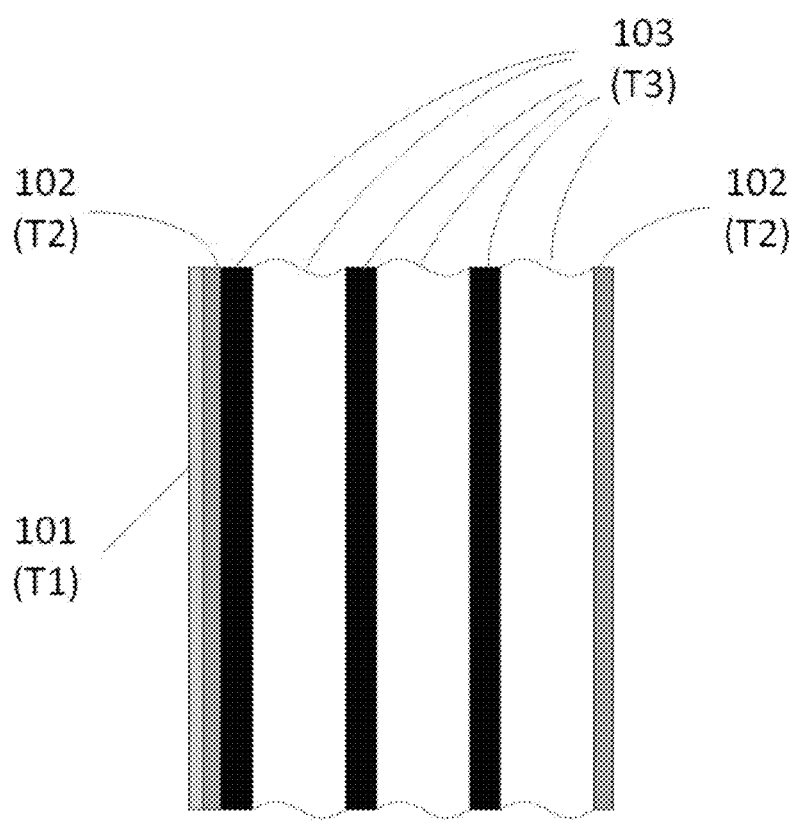
FIG. 5 is a schematic of the cross-sectional view of a matrix composite arranged in a multi-layer construct, according to an embodiment.

FIG. 5 shows embodiment 100 of the present invention in which a matrix composite is formed of a multi-layer construct. Poly(urethane urea) elastomer 101 of thickness T1 has high dynamic strain-rate hardening characteristics. Layer 101 may be formed of about 39 wt. % 4,4'-dicyclohexylmethane diisocyanate, about 13 wt. % diethyltoluenediamine, and about 48 wt. % poly(tetramethylene oxide), where the molecular weight of poly(tetramethylene oxide) is 650 g/mol, for example.

In layers 102, each of thickness T2 and in layers 103, each of thickness T3, poly(urethane urea) elastomers have moderate dynamic strain-rate hardening characteristics. Layers 102 may be formed of about 34 wt. % 4,4'-dicyclohexylmethane diisocyanate, about 14 wt. % diethyltoluenediamine, and about 52 wt. % poly(tetramethylene oxide), where the molecular weight of poly(tetramethylene oxide) is 1,000 g/mol, for example.

Layer 103 may be formed of about 31 wt. % 4,4'-dicyclohexylmethane diisocyanate, about 10 wt. % diethyltoluenediamine, and about 59 wt. % poly(tetramethylene oxide), where the molecular weight of poly(tetramethylene oxide) is 1,000 g/mol, for example.

The thicknesses T1, T2 and T3 of the corresponding PUU layers, 101, 102 and 103 shown in embodiment 100 may vary in accordance design specifications and/or intended use or application. For example, in some embodiments, T1 may be about 6-12 μm, T2 may be over the range between about 6-12 μm and about 2-3 mm and T3 may be over the range between about 0.15 mm and about 2-3 mm.

The poly(urethane urea) elastomers for layer 101 are efficient against shockwaves over the range of strain rates $10^3$-$10^6$/sec, along with poly(urethane urea) elastomers for layer 102 having strong dynamic strengthening capability over the range of strain rates $10^4$-$10^6$/sec, are key attributes to a multi-layer construct, with the potential to provide an armor material with enhanced protection against both ballistic and blast damages. Thus, layer 101 may be oriented towards the exterior of the matrix composite to be first impacted.

Figure 6A:
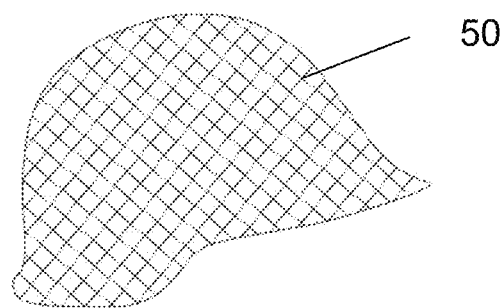
FIG. 6a is a schematic of helmet.
Figure 6B:
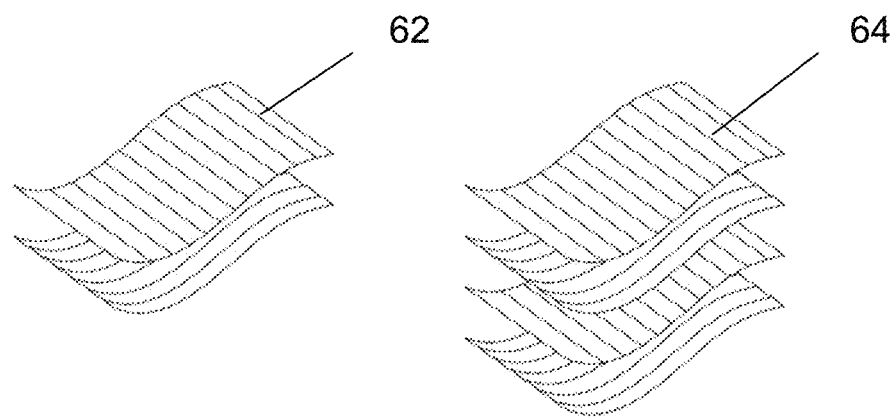
FIG. 6b is a schematic of a representative prepreg layer comprising a two-layer or a four-layer assembly of cross-plies with fiber orientation at 0°/90° or 0°/90°/0°/90°.

FIG. 6a is a schematic of one exemplary helmet 50. The helmet 50 may be an Advanced Combat Helmet (ACH) or Enhanced Combat Helmet (ECH) system used by the U.S. military, for example. FIG. 6b shows a schematic of a representative prepreg layer assemblies including a two-layer prepreg assembly 62 and a four-layer prepreg assembly 64 of cross-plies with fiber orientation at 0°/90° and 0°/90°/0°/90°, respectively. Each individual prepreg ply may have approximately the same thickness, for example, about 6-12 μm. The term "prepreg" is a term of art and refers to a material element comprising a network of high-strength fibers consolidated in a polymer matrix material. A prepreg may be fabricated from a plurality of fiber layers in some instances.

Figure 6C:
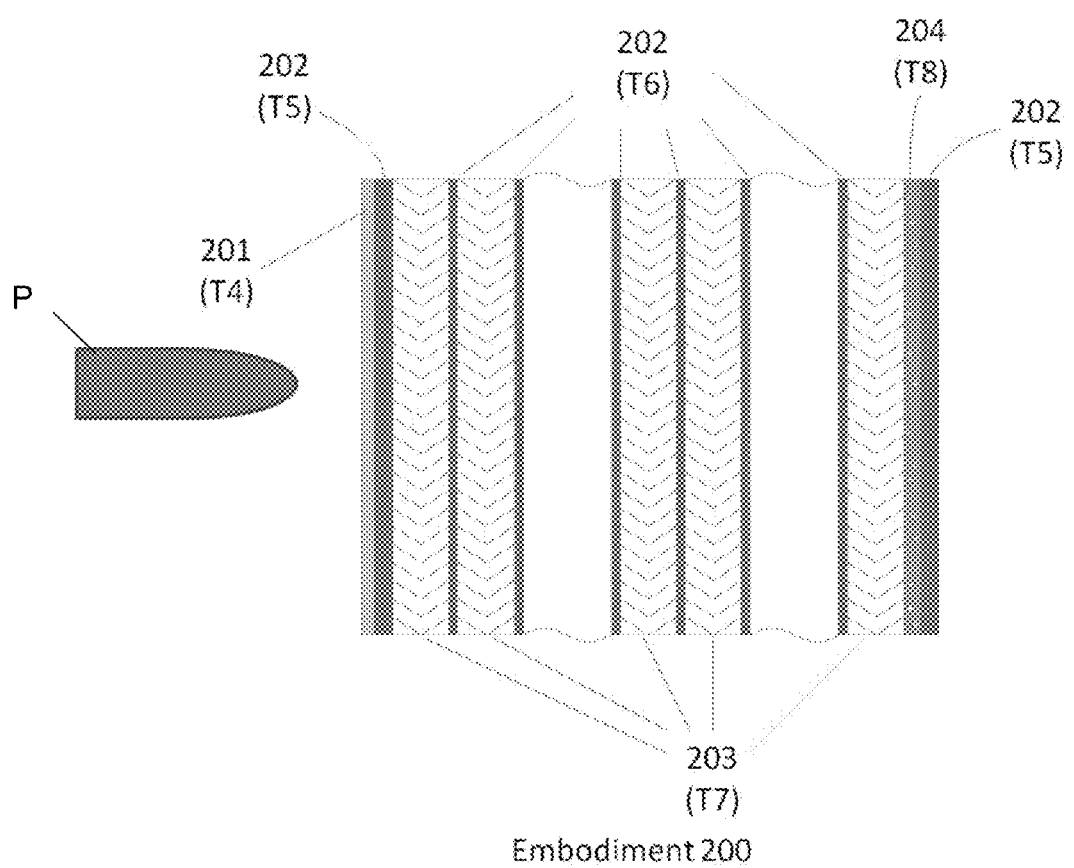
FIG. 6c is a schematic of the cross-sectional view of a representative laminated structure for the helmet shown in FIG. 6a, where a matrix composite of poly(urethane urea) elastomers arranged in a multi-layer construct is integrated with multi-layers of fiber-reinforced prepreg materials. The matrix composite serves as either interlayers bonded between the prepregs or as the outer-most layers to both the exterior and interior of the helmet, according to an embodiment.

FIG. 6c shows embodiment 200 of the present invention for an improvement for helmet shown in FIG. 6a. An example projectile P, such a bullet, is also illustrated in relation to embodiment 200. Prepreg layers 203 of thickness T7 are consolidated with poly(urethane urea) elastomer inter-layers 202 of thickness T5, along with poly(urethane urea) layer 201 of thickness T4 poly(urethane urea) layers 202 of thickness T5, poly(urethane urea) layers 202 of thickness T6, and the backing layers including composite layer 204 of thickness T8 comprising encapsulated hollow glass microspheres in poly(urethane urea) matrix PUU B as well as poly(urethane urea) layer 202 of thickness T5, to provide an armor material with enhanced protection against both ballistic and blast damage. The prepreg materials may be selected from fiber reinforcement materials including, for example, polyethylene fibers (such as Dyneema® or Spectra Shield II® fibers), aramid fibers, or a mixture thereof. Other types of reinforcement fibers may also be used to this end.

In accordance with embodiments of the present invention, a method for fabrication of embodiment 200, includes first casting the poly(urethane urea) elastomers in the form of thin films of desired thickness, followed by laying out the preferred polyethylene fiber reinforced prepreg materials along with poly(urethane urea) films for consolidation.

Each ply of poly(urethane urea) interlayers 202 comprising approximately the same thickness, preferably about 30-60 μm, wherein each poly(urethane urea) elastomers 201 and 202 among the outer-most layers to both the exterior and interior of the helmet comprising approximately the same thickness, preferably about 1-3 mm. The total number of prepreg plies as well as the details of the layup may be selected accordingly to the area density and/or performance specification requirements. For some applications, the prepregs and poly(urethane urea) films may be consolidated following a commercial molding cycle process per manufacturer's recommendation for fabrication of composites for helmets in accordance with the detailed military specification, MIL-DTL-62474F.

Figure 6D:
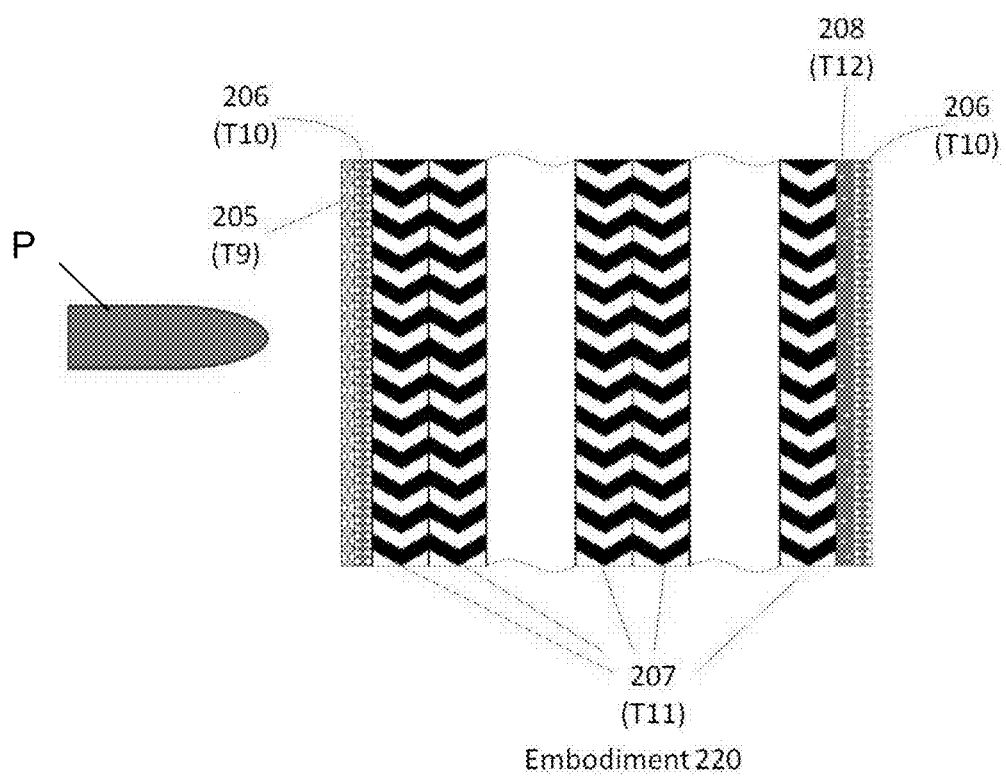
FIGS. 6d and 6e are the schematics of the cross-sectional view of representative laminated structures for the helmet shown in FIG. 6a, where a matrix composite of poly (urethane urea) elastomers arranged in a multi-layer construct is utilized to form composites. The poly(urethane urea) elastomers serve as matrix prepared in an aqueous dispersion useful for coating of a plurality of a network of high strength fibers to form consolidated prepreg materials. The poly(urethane urea) elastomers particularly of greater strain-rate sensitivity serve as the outer-most layers to both the exterior and interior of the helmet, according to an embodiment.

FIG. 6d shows embodiment 220 with an improvement in which fiber reinforced prepregs include a poly(urethane urea) matrix PUU C based prepreg layer 205 of thickness T9, a poly(urethane urea) matrix PUU B based prepreg layers 206 of thickness T10, and a poly(urethane urea) matrix PUU A based prepreg layers 207 of thickness T11, along with a layer 208 of thickness T12 comprising encapsulated hollow glass microspheres in poly(urethane urea) matrix PUU B are consolidated to provide an armor material with enhanced protection against both ballistic and blast damage. The prepreg materials may comprise the fiber layers of Dyneema® or Spectra Shield II®, aramid fibers, or any mixture thereof, for consolidation with the poly(urethane urea) elastomers as matrix. An example projectile P, such a bullet, is also illustrated in relation to embodiment 202.

In further accordance with another embodiment of the present invention, poly(urethane urea) elastomer PUU B, having greater dynamic mechanical strengthening characteristics than poly(urethane urea) matrix PUU A, can be utilized as the matrix for the core prepreg material layers.

Figure 6E:
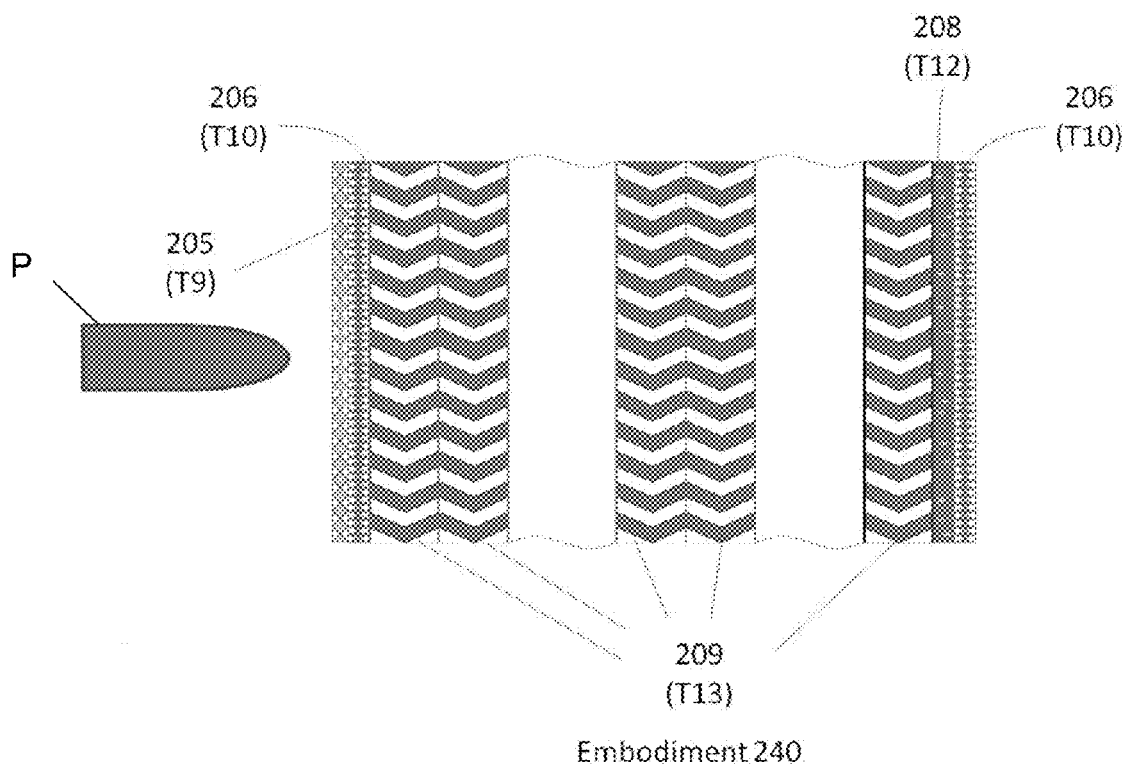

FIG. 6e shows embodiment 240 of the present invention with a further improvement in which fiber reinforced prepregs include a poly(urethane urea) matrix PUU C based prepreg layer 205 of thickness T9, a poly(urethane urea) matrix PUU B based prepreg layers 206 of thickness T10, and a poly(urethane urea) matrix PUU B based prepreg layers 209 of thickness T13, along with a layer 208 of thickness T12 comprising encapsulated hollow glass microspheres in poly(urethane urea) matrix PUU B are consolidated to provide an armor material with further enhanced protection against both ballistic and blast damage. The prepreg materials may comprise the fiber layers of Dyneema® or Spectra Shield II®, aramid fibers, or any mixture thereof, for consolidation with the poly(urethane urea) elastomers as matrix. Since weight and density are important parameters for helmet and armor systems, hollow glass is preferred over solid glass for the beads. However, for other applications, solid glass beads might be used. An example projectile P, such a bullet, is also illustrated in relation to embodiment 240.

In fabricating embodiment 220 and embodiment 240, for example, the poly(urethane urea) elastomers can be prepared in an aqueous dispersion for coating of select fiber reinforcements. The fiber reinforcements may be polyethylene fibers, such as Dyneema® and Spectra Shield II®, as well as aramid fibers, or any mixture thereof, to form prepreg materials. Each prepreg may comprise a multi-layer assembly of cross-plies with fibers at orientation at 0°/90°/0°/90°, with each individual prepreg ply comprising approximately the same thickness approximately 6-12 μm, with each prepreg assembly among the outer-most layers to both the exterior and interior of the helmet comprising approximately the same thickness, preferably about 0.5-2 mm. The total number of prepreg plies, as well as the details of the layup, may be selected accordingly to the area density and/or performance specification requirements. For some applications, the prepregs may be consolidated following a commercial molding cycle process per manufacturer's recommendation for fabrication of composites for helmets in accordance with the detailed military specification, MIL-DTL-62474F.

In some embodiments, the PUU elastomers having high strain-rate hardening characteristics may be further utilized to encapsulate the hollow glass microspheres of various size for fabrication of poly(urethane urea) matrix/hollow glass microsphere based composites to provide an armor material to further the blast mitigation capability.

Figure 6F:
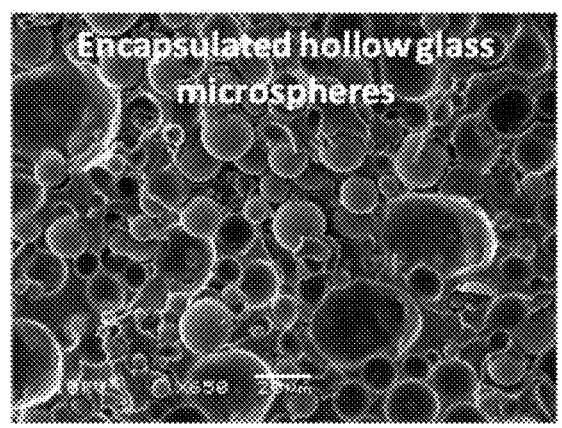
FIG. 6f shows the choice of hollow glass microspheres with a broad range of particle size distribution encapsulated in poly(urethane urea) matrix for fabrication of a composite layer capable of blast and shockwaves mitigation, according to an embodiment.

FIG. 6f shows a micrograph from scanning electron microscopy of encapsulated hollow glass microspheres with a broad range of particle size distribution.

In accordance with the present invention, a method for fabrication of composite layers 204 and 208, includes encapsulating hollow glass microspheres in poly(urethane urea) elastomer matrix PUU B, where the poly(urethane urea) and hollow glass microspheres are mixed and cast in the form of thin films of desired thickness preferably about 1-3 mm. The hollow glass microspheres may be formed of 3 M IM30K of soda-lime-borosilicate glass (density of 0.6 g/cm$^3$) having a broad range of particle size distribution, ranging from about 9 μm to 29 μm in diameter, and having crash strength of about 30,000 psi. The hollow glass microsphere along with dynamic strain rate hardening of poly(urethane urea) matrix can provide a helmet or armor material system with enhanced protection against blast damage.

Figure 7:
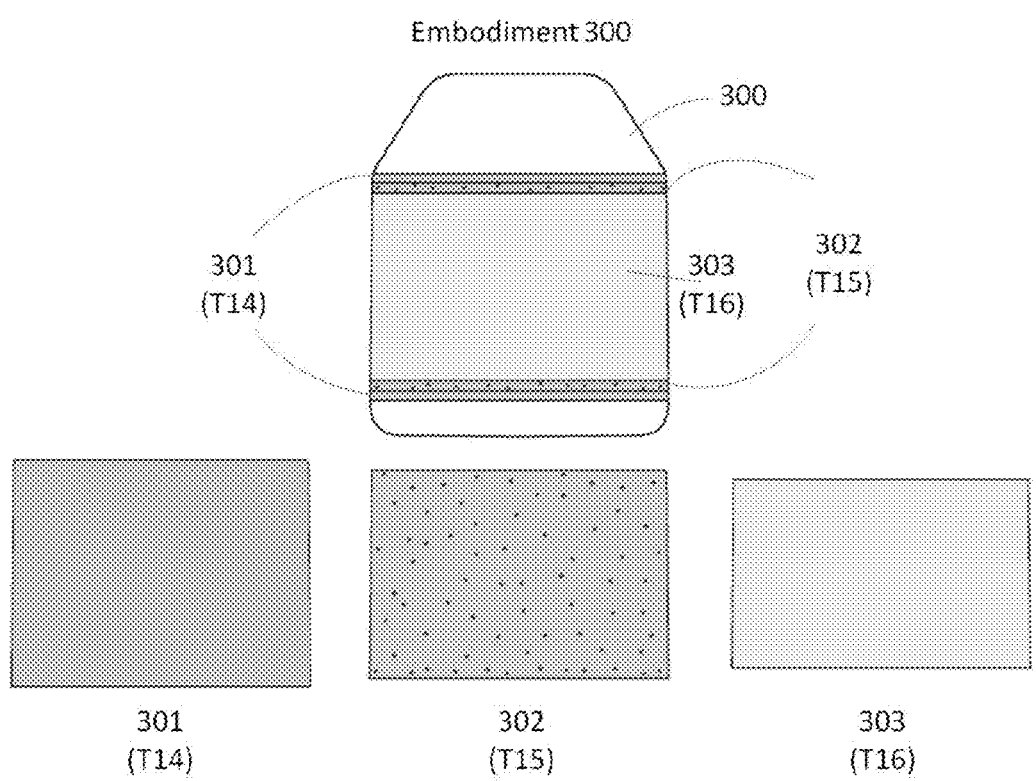
FIG. 7 is a schematic for body armor application, wherein one method by which body armor plate can be first coated with composites comprising encapsulated hollow glass microspheres in poly(urethane urea) elastomer matrix, followed by another top layers of coating comprising a matrix composite of poly(urethane urea) elastomer, according to an embodiment.

FIG. 7 shows an improvement of embodiment 300, according to the present invention, wherein a body armor plate is encapsulated by coating with a matrix composite comprising poly(urethane urea) elastomers, PUU B of thickness T14 in layer 301 and PUU C of thickness T16 in layer 303, along with composite 302 of thickness T15 comprising hollow glass microspheres in poly(urethane urea) elastomer matrix PUU B, to provide enhanced protection against blast damage.

In fabricating embodiment 300 according to embodiments of the present invention, a method includes an aqueous dispersion comprising poly(urethane urea) elastomer PUU B and hollow glass microspheres is pre-mixed, wherein the well-mixed coating is applied to completely encapsulate the body armor plate at desired thickness preferably about 1-3 mm, wherein the preferred hollow glass microspheres such as 3M IM30K of soda-lime-borosilicate glass (density of 0.6 g/cm$^3$) comprising a broad range of particle size distribution, from 9 µm to 29 µm, having crash strength of about 30,000 psi. Additional layers of topcoat are applied comprising poly(urethane urea) elastomer layers 301 and 303 of thickness preferably about 1-2 mm.

Figure 8:
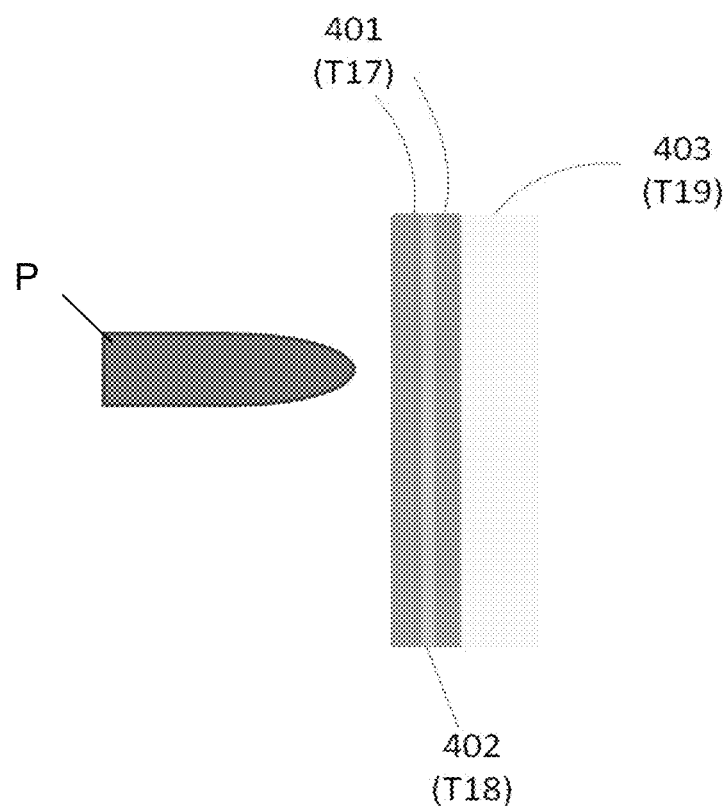
FIG. 8 is a schematic for face shield application, wherein poly(urethane urea) or polyurethane elastomers particularly of dynamic strain-rate hardening characteristics are used along with a spall-shield polymer backing layer to provide an armor material with significantly enhanced energy dissipation and shockwaves mitigation capabilities, according to an embodiment.

FIG. 8 shows embodiment 400 with an improvement in face shield for an ACH helmet. An example projectile P, such a bullet, is also illustrated in relation to embodiment 400. Embodiment 400 may be formed of a matrix composite arranged in a multi-layer construct comprising poly(urethane urea) elastomers, PUU B in layer 401 of thickness T17 and PUU C in layer 402 of thickness T18, wherein the matrix composite of poly(urethane urea) elastomers is bonded to polymer backing layer 403 of thickness T19, wherein polymer backing layer is polycarbonate or TROGAMID polyamides (such as those available from Evonik Industries, Germany). The poly(urethane urea) elastomers may be amorphous and not covalently cross-linked and of high strain-rate sensitivity, with the poly(urethane urea) elastomers having greater shockwaves mitigation capability than polymer backing layer facing the threats. The poly (urethane urea) PUU C in layer 402 bonded between poly (urethane urea) PUU B in layers 401 has greater strain-rate sensitivity, with thickness of poly(urethane urea) films for layers 401 and 402 is about 0.3-0.5 mm and about 0.5-0.7 mm, respectively. Embodiment 400 may be integrated with ACH helmet to provide enhanced mitigation of shockwaves transmission through the face to the intracranial cavity, thus reducing intracranial stresses to prevent military personnel concussion.

In the case of fabrication for embodiment 400 according to the present invention, a method including the steps wherein poly(urethane urea) elastomers are first cast and used in film form, followed by lamination in accordance with the manufacturer's specification for transparent armor.

Figure 9A:
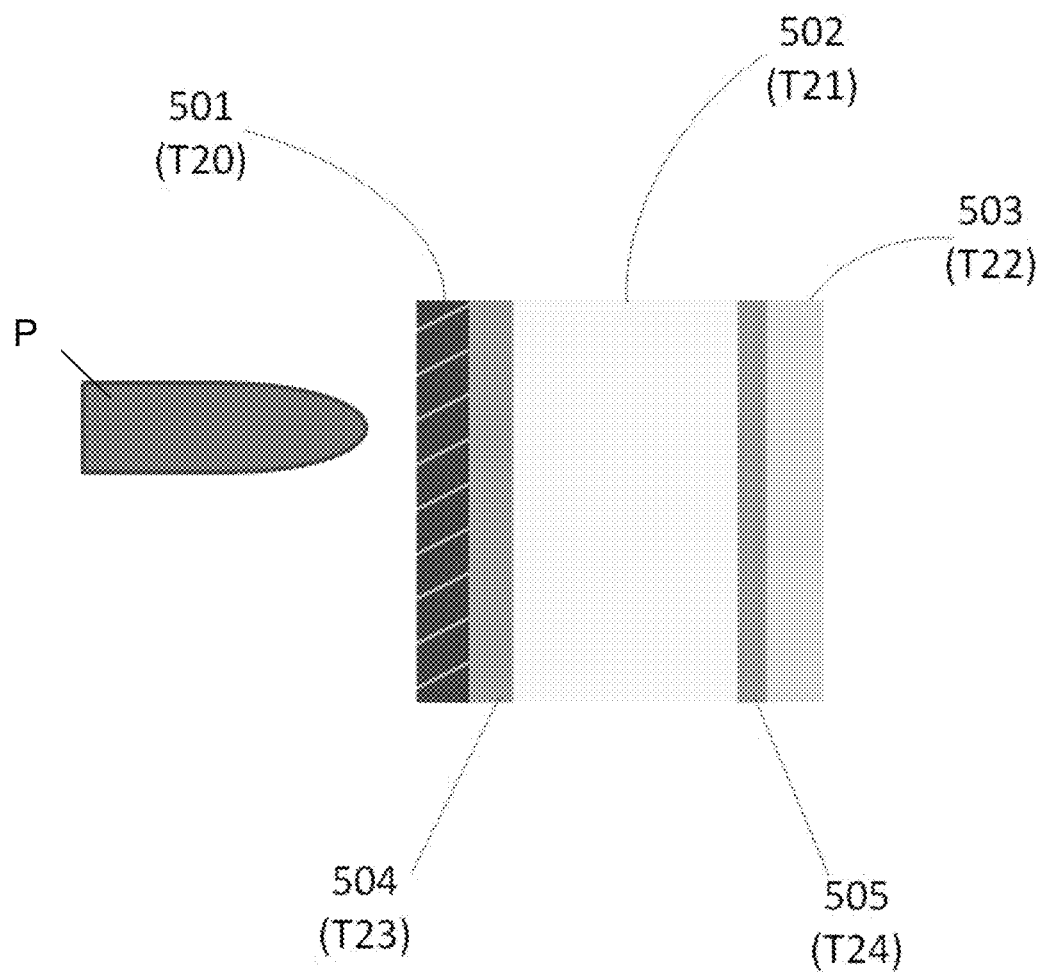
FIGS. 9a and 9b are schematics for transparent lightweight armor, wherein poly(urethane urea) elastomers particularly of dynamic strain-rate hardening characteristics are used to bond between glass and polymer interlayer, as well as between polymer layers to provide an armor material with significantly enhanced energy dissipation capability, according to an embodiment.

In accordance with the present invention, FIG. 9a shows embodiment 500 with an improvement in transparent armor. The striking face layer 501 of thickness T20 may include one or more glass layers or a combination of glass and ceramic layers (illustrated as a single layer), along with poly(methyl methacrylate) interlayers 502 of thickness T21 (illustrated as a single layer), and a spall-shield backing layer 503 (such as polycarbonate) of thickness T22 bonded with poly(urethane urea) elastomers. Poly(urethane urea) elastomers, PUU C of thickness T23 in layer 504 and PUU B of thickness T24 in layer 505, formed in a multilayer construct, are amorphous and not covalently cross-linked and of high strain-rate sensitivity are also included. The thickness of poly(urethane urea) film layer 504 may be about 0.45-0.65 mm whereas the thickness of poly(urethane urea) film layer 505 may be about 1.0-1.3 mm. Poly(urethane urea) adhesive PUU C in layer 504 having greater dynamic strain-rate hardening is used to bond between glass and poly(methyl methacrylate) as well as between poly(methyl methacrylate) interlayers (not shown due to illustration as a single layer) than poly(urethane urea) adhesive PUU B in layer 505 used to bond between poly(methyl methacrylate) and said polycarbonate layers as well as between glass layers (not shown due to illustration as a single layer). The poly(urethane urea) elastomers have a tensile modulus at 100% strain significantly higher than those reported for a commercial Deerfield Dureflex® A4700 polyurethane film adhesive (available from Bayer MaterialScience) used in many conventional transparent glass-plastic armors. An example projectile P, such a bullet, is also illustrated in relation to embodiment 500.

Table 4, below, lists the values of tensile modulus of selected elastomers at 100% strain.

TABLE 4

| | Tensile modulus at 100% strain Psi |
|---|---|
| Deerfield A4700 polyurethane [comparative example] | 500 |
| Poly(urethane urea)s [Compositions shown in Table 1] | ≥1,320 |

The choice of thickness T20 for the glass layer 501, thickness T21 of poly(methyl methacrylate) interlayers 502, and thickness T22 of polymer backing layer 503 depends on the system performance specification requirements. In the case of fabrication for embodiment 500 according to the present invention, a method includes casting the poly(urethane urea) elastomers in film form, followed by the layup of glass, poly(methyl methacrylate) and polycarbonate plates, as well as the cast poly(urethane urea) films and assembled for consolidation in accordance with the manufacturer's specification for transparent armor, also described in Patel P. J., Hsieh A. J., Gilde G. A., "Improved Low-Cost Multi-Hit Transparent Armor", 25$^{th}$ Army Science Conference, Orlando, Fla. (2006).

Figure 9B:
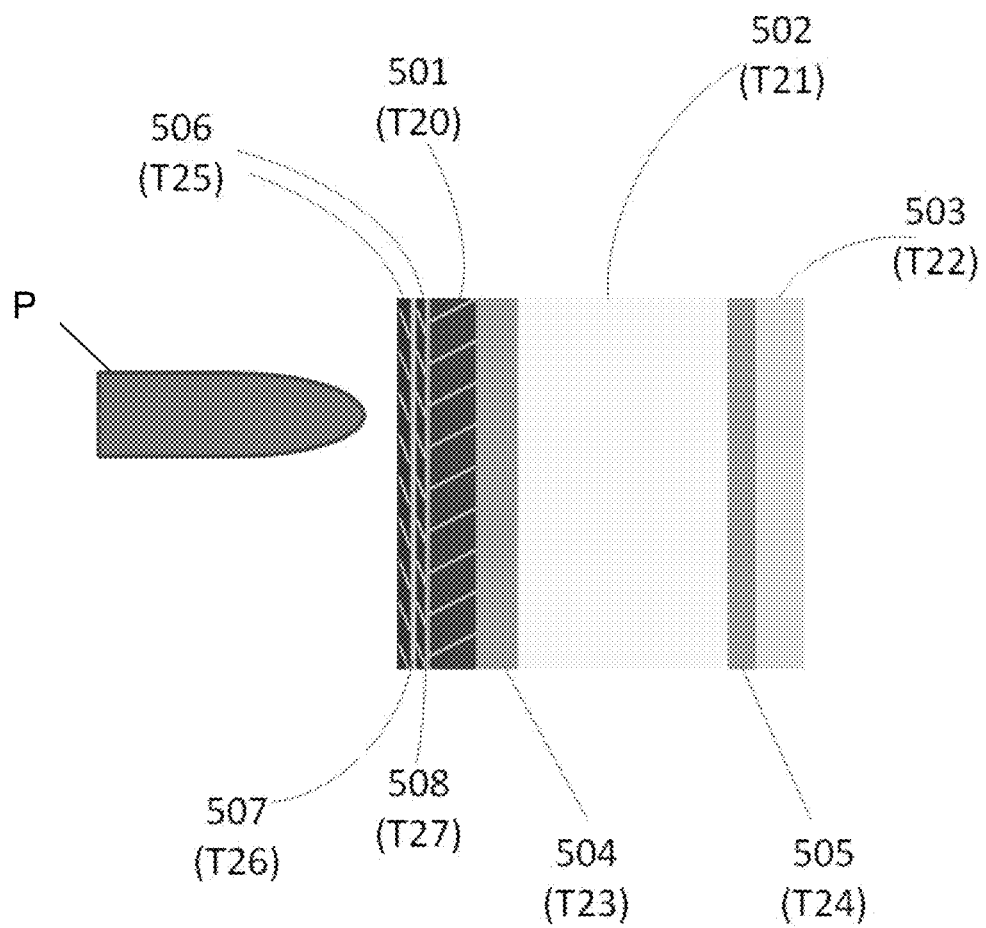

FIG. 9b shows embodiment 520 with an improvement in transparent armor over embodiment 500. Here, additional thin cover glass layers 506 of thickness T25 are incorporated in front of the striking face layer 501 of thickness T20. The striking front face layer may comprise one or a plurality of glass or a combination of glass and ceramic layers (illustrated as a single layer), along with poly(methyl methacrylate) interlayers 502 of thickness T21 (illustrated as a single layer), and a spall-shield backing layer 503 (said polycarbonate) of thickness T22 are bonded with poly(urethane urea) elastomers. The poly(urethane urea) elastomers can be formed in a multilayer construct, comprising PUU C of thickness T23 in layer 504, PUU B of thickness T24 in layer 505, PUU B of thickness T27 in layer 508, as well as layer 507 of thickness T26 which are generally amorphous and not covalently cross-linked and of high strain-rate sensitivity. Layer 507 may be either a single layer of poly(urethane urea) adhesive or a bi-layer of poly(urethane urea) elastomers. An example projectile P, such a bullet, is also illustrated in relation to embodiment 520.

Figure 9C:
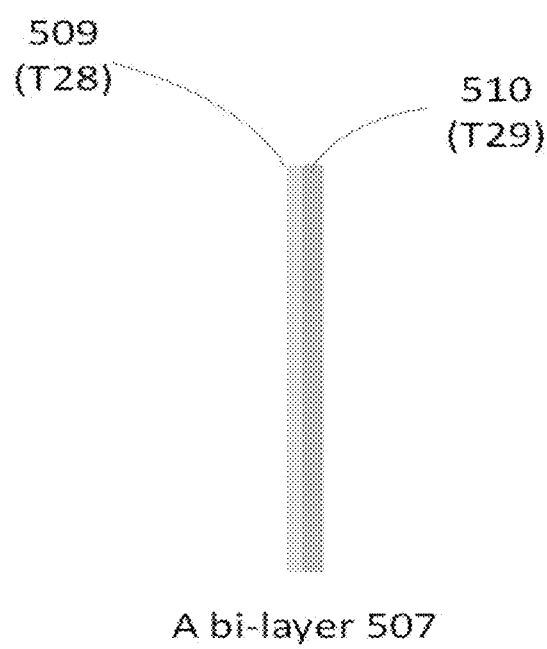
FIG. 9c shows a schematic for a bi-layer of poly(urethane urea) elastomer that can be used for bonding between thin cover glasses in the transparent lightweight armor shown in FIG. 9b according to an embodiment.

FIG. 9c shows a schematic for a bi-layer 507 of poly (urethane urea) elastomer that can be used for bonding between thin cover glasses in the transparent lightweight armor shown in FIG. 9b, according to an embodiment.

A bi-layer design comprising poly(urethane urea) elastomers can have varying dynamic strain-rate hardening characteristics, in contrast to a single-thin-cover-glass design with polyurethane adhesive disclosed, for example, in U.S. Patent Application Publication No. 2012/0174761 A1. For instance, a combination of multiple thin cover glass layers in conjunction of multi-layers of poly(urethane urea) elastomers of dynamic strain-rate hardening characteristics, according to the present invention, can be utilized to provide an armor material with further improved multi-hit performance with the face of the bi-layer adhesive 507 comprising poly(urethane urea) elastomer 509 of thickness T28 having great dynamic strain-rate hardening is used to bond the front cover glass layer 506, whereas the rear of the bi-layer adhesive 507 comprising poly(urethane urea) elastomer 510 of thickness T29 is used to bond the second cover glass layer 506. Poly(urethane urea) adhesive can be used to bond between cover glass layers, having greater dynamic strain-rate hardening than poly(urethane urea) adhesives used to bond between all other layers, wherein combined benefits including a synergy with respect to dynamic strain-rate hardening readily in both glassy poly(methyl methacrylate) and poly(urethane urea) elastomers.

The construction comprising multiple thin cover glass layers and poly(urethane urea) elastomers enables confinement of inherently dynamic strain-rate hardening poly(urethane urea) elastomer adhesive as well as dynamically-strengthening as a result of encapsulated thin cover glass layer. The thickness of cover glass may be about 1 mm, for instance. The thickness of poly(urethane urea) films 507 and 508 is about 0.35-0.45 mm, and, in the case of a bi-layer 507, the thicknesses may be about 0.15 mm and 0.30 mm for film 509 and 510, respectively, whereas thicknesses may be about 0.45-0.65 mm and about 1.0-1.3 mm for poly(urethane urea) films 504 and 505, respectively, with the poly(urethane urea) elastomers having tensile modulus at 100% strain significantly higher than those reported for a commercial Deerfield A4700 polyurethane film adhesive used in many conventional transparent glass-plastic armor.

In the case of fabrication for embodiment 520 according to the present invention, a method include first casting poly(urethane urea) elastomers in film form, followed by the layup of thin cover glass, glass plates, poly(methyl methacrylate) and polycarbonate, as well as the cast poly(urethane urea) films and assembled for consolidation in accordance with the manufacturer's specification for transparent armor, also similarly described in Patel P. J., Hsieh A. J., Gilde G. A., "Improved Low-Cost Multi-Hit Transparent Armor", 25$^{th}$ Army Science Conference, Orlando, Fla. (2006).

Table 5, below, lists exemplary layer materials for application in a matrix composite for embodiment 100 and other embodiments of the invention disclosed herein. The poly(urethane urea)s listed here, PUUA, PUUB, and PUUC correspond to the chemical compositions detailed in Table 1, above.

TABLE 5

| PUU | Application in a matrix of composite for embodiment 100 Layer # | Application in a matrix of composite for other embodiments Layer # |
|---|---|---|
| A | 103 | 207 |
| B | 102 | 202, 204, 206, 208, 209, 303, 401, 505, 507, 508, 510 |
| C | 101 | 201, 205, 301, 302, 402, 504, 509 |

In accordance with various embodiments, one or more of the poly(urethane urea) layers can be applied as an adhesive, aqueous dispersion, or a film. For example, a method of forming thermoplastic elastomers, preferably poly(urethane urea)s, in an aqueous dispersion is described by Gao R., Zhang M., Dixit N., Moore R. B., Long T. E., in "Influence of ionic charge placement on performance of poly(ethylene glycol)-based sulfonated polyurethanes," Polymer, Vol. 53, Issue 6, pp. 1203-1211 (2012), useful for coating of a plurality of a network of high strength fibers to form consolidated prepreg material.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

All patents, patent applications, articles and other references mentioned herein are hereby incorporated by reference in their entireties.

What is claimed is:

1. A matrix composite for impact resistance and blast mitigation, the matrix composite formed in a multi-layer configuration comprising:
    (a) one or more outer layers comprising poly(urethane urea); and
    (b) one or more inner layers comprising poly(urethane urea) of a different composition than that of the one or more outer layers,
        wherein the one or more outer layers have a broader strain-rate sensitivity characteristic range than the one or more inner layers.

2. A matrix composite for impact resistance and blast mitigation, the matrix composite formed in a multi-layer configuration comprising:
    (a) one or more outer layers comprising poly(urethane urea) having a strain-rate sensitivity characteristic over the range of 1,000/sec to 1,000,000/sec; and
    (b) one or more inner layers comprising poly(urethane urea) of a different composition than that of the one or more outer layers having a strain-rate sensitivity characteristic over the range of 10,000/sec to 1,000,000/sec.

3. The matrix composite of claim 2, wherein the materials of the outer and inner layers comprise the same poly(urethane urea) chemistry and have a phase-mixed microstructure.

4. The matrix composite of claim 3, wherein the poly(urethane urea) of the outer and inner layers is formed of 4,4'-dicyclohexylmethane diisocyanate, diethyltoluenediamine, and poly (tetramethylene oxide).

5. The matrix composite of claim 3, wherein the poly(urethane urea)s of the one or more outer layers are formed of about 39 wt. % 4,4'-dicyclohexylmethane diisocyanate, about 13 wt. % diethyltoluenediamine, and about 48 wt. % poly(tetramethylene oxide), with the molecular weight of the poly(tetramethylene oxide) being about 650 g/mol.

6. The matrix composite of claim 3, wherein the poly(urethane urea)s of the one or more inner layers are formed of: about 31-34 wt. % 4,4'-dicyclohexylmethane diisocyanate; about 10-14 wt. % diethyltoluenediamine; and about 52-59 wt. % poly(tetramethylene oxide), with the molecular weight of poly(tetramethylene oxide) being about 1,000 g/mol.

7. The matrix composite of claim 3, further comprising: a next layer positioned behind the one or more outer layers and formed of: about 34 wt. % 4,4'-dicyclohexylmethane diisocyanate; about 14 wt. % diethyltoluenediamine; and about 52 wt. % poly(tetramethylene oxide), with the molecular weight of poly(tetramethylene oxide) being about 1,000 g/mol.

8. The matrix composite of claim 2, wherein the poly(urethane urea)s of the outer and inner layers are generally amorphous.

9. The matrix composite of claim 2, wherein none of the poly(urethane urea)s of the outer and inner layers is covalently cross-linked within its respective layer.

10. The matrix composite of claim 2, wherein one or more outer layers or an intermediate layer other than any of the inner or outer layers are formed of a prepreg material.

11. The matrix composite of claim 10, wherein the prepreg materials comprises fiber reinforcements encapsulated in a poly(urethane urea) matrix.

12. The matrix composite of claim 2, wherein the one or more outer layers comprises hollow glass microspheres encapsulated in a poly(urethane urea) matrix.

13. The matrix composite of claim 2, wherein all the inner and outer layers have a tensile modulus of at least about 1,320 psi (9.1 MPa) at 100% strain measured at a strain rate of about 0.01/sec.

14. The matrix composite of claim 2, wherein the one or more inner layers have a greater tensile strength than those of the one or more outer layers, and the one or more inner layers and the one or more outer layers have similar tensile modulus values.

15. The matrix composite of claim 2, wherein the compressive flow stress values of all the inner and outer layers at strain rates of about 1,000-2,500/sec are higher in comparison with the corresponding compressive flow stress values at strain rates of about 0.01/sec.

16. The matrix composite of claim 2, wherein the strain-rate sensitivity of the one or more outer layers are greater than those of the one or more inner layers at strain-rates of about 1,000-2,500/sec.

17. The matrix composite of claim 2, wherein the outer-most of the one or more outer layers has the greatest strain-rate sensitivity characteristic of all the layers.

18. The matrix composite of claim 2, wherein the segmental relaxation time of the outer-most of the one or more outer layers is approximately $2 \times 10^{-2}$s at 25° C.

19. The matrix composite of claim 2, wherein the values of segmental relaxation time of the one or more inner layers are approximately $7.5–10.5 \times 10^{-6}$s at 25° C.

20. The matrix composite of claim 2, wherein the one or more inner layers comprise at least two different types of layers as a unit, the unit being repeated one or more times in the matrix composite.

21. The matrix composite of claim 2, wherein one or more of the inner and/or outer layers are applied as an adhesive, aqueous dispersion, or a film.

22. The matrix composite of claim 2, wherein one of the one or more outer layers comprises a bi-layer comprising a poly(urethane urea) layer and a glass layer.

23. A ballistic-resistant material system formed of the matrix composite of claim 2.

24. The ballistic-resistant material system of claim 23, configured as a helmet, armor, face shield, or a transparent window element.

25. The ballistic-resistant material system of claim 23, wherein there are multiple outer layers and multiple inner layers where:
(a) each of the outer layers are approximately the same thickness; and
(b) each of the inner layers are approximately the same thickness.

26. The matrix composite of claim 2, wherein said matrix does not comprise a metal or ceramic plate.

27. The matrix composite of claim 2, further comprising: one or more additional layers comprising poly(urethane urea) positioned between the inner and outer layers.

28. A matrix composite for impact resistance and blast mitigation, the matrix composite formed in a multi-layer configuration comprising:
(a) an outer layer formed of about 39 wt. % 4,4'-dicyclohexylmethane diisocyanate, about 13 wt. % diethyltoluenediamine, and about 48 wt. % poly(tetramethylene oxide), with the molecular weight of the poly(tetramethylene oxide) being about 650 g/mol;
(b) a next layer comprising poly(urethane urea) positioned behind the outer layer and formed of: about 34 wt. % 4,4'-dicyclohexylmethane diisocyanate; about 14 wt. % diethyltoluenediamine; and about 52 wt. % poly(tetramethylene oxide), with the molecular weight of poly(tetramethylene oxide) being about 1,000 g/mol; and
(c) one or more inner layers comprising poly(urethane urea) positioned behind the next layer and formed of: about 31 wt. % 4,4'-dicyclohexylmethane diisocyanate; about 10 wt. % diethyltoluenediamine; and about 59 wt. % poly(tetramethylene oxide), with the molecular weight of poly(tetramethylene oxide) being about 1,000 g/mol.

29. A matrix composite for impact resistance and blast mitigation, the matrix composite formed in a multi-layer configuration comprising:
(a) an outermost layer of poly(urethane urea) formed of about 39 wt. % 4,4'-dicyclohexylmethane diisocyanate, about 13 wt. % diethyltoluenediamine, and about 48 wt. % poly(tetramethylene oxide), with the molecular weight of poly(tetramethylene oxide) being about 650 g/mol;
(b) a next layer of poly(urethane urea) positioned behind the outermost layer and formed of about 34 wt. % 4,4'-dicyclohexylmethane diisocyanate; about 14 wt. % diethyltoluenediamine; and about 52 wt. % poly(tetramethylene oxide), with the molecular weight of poly(tetramethylene oxide) being about 1,000 g/mol;
(c) one or more additional layers of poly(urethane urea) positioned behind the next layer and formed of about 31 wt. % 4,4'-dicyclohexylmethane diisocyanate; about 10 wt. % diethyltoluenediamine; and about 59 wt. % poly(tetramethylene oxide), with the molecular weight of poly(tetramethylene oxide) being about 1,000 g/mol; and
(d) an innermost layer of poly(urethane urea) positioned behind the one or more additional layers and formed of about 34 wt. % 4,4'-dicyclohexylmethane diisocyanate; about 14 wt. % diethyltoluenediamine; and about 52 wt. % poly(tetramethylene oxide), with the molecular weight of poly(tetramethylene oxide) being about 1,000 g/mol,
wherein the outermost layer has a broader strain-rate sensitivity characteristic range than the next layer and the innermost layer.

30. The matrix composite of 29, wherein
the outermost layer has a strain-rate sensitivity characteristic over the range of 1,000/sec to 1,000,000/sec; and
the next layer and the innermost layer have a strain-rate sensitivity characteristic over the range of 10,000/sec to 1,000,000/sec.

31. The matrix composite of 29, wherein,
the thickness of the outermost layer of poly(urethane urea) is about 6-12 μm;
the thickness of the next layer of poly(urethane urea) is about 6-12 μm;
the thickness of the one or more additional layers of poly(urethane urea) is between about 0.15 mm and about 2-3 mm; and
the thickness of the innermost layer of poly(urethane urea) is between about 6-12 μm and about 2-3 mm.

* * * * *